US008260708B2

(12) United States Patent
Potkonjak

(10) Patent No.: US 8,260,708 B2
(45) Date of Patent: Sep. 4, 2012

(54) USAGE METERING BASED UPON HARDWARE AGING

(75) Inventor: Miodrag Potkonjak, Los Angeles, CA (US)

(73) Assignee: Empire Technology Development LLC, Wilmington, DE (US)

(*) Notice: Subject to any disclaimer, the term of this patent is extended or adjusted under 35 U.S.C. 154(b) by 61 days.

(21) Appl. No.: 12/426,141

(22) Filed: Apr. 17, 2009

(65) Prior Publication Data

US 2010/0269150 A1 Oct. 21, 2010

(51) Int. Cl.
*G06F 21/00* (2006.01)

(52) U.S. Cl. .......... 705/52; 726/2; 726/27; 726/29; 726/34; 705/56; 705/59; 705/904; 705/905; 705/907; 705/909; 380/231

(58) Field of Classification Search .......... 705/52, 705/904, 905, 907, 909
See application file for complete search history.

(56) References Cited

U.S. PATENT DOCUMENTS

| | | | | |
|---|---|---|---|---|
| 5,825,883 A * | 10/1998 | Archibald et al. | | 705/53 |
| 6,157,231 A * | 12/2000 | Wasson | | 327/156 |
| 6,223,314 B1 * | 4/2001 | Arabi et al. | | 714/726 |
| 6,469,518 B1 * | 10/2002 | Davis et al. | | 324/600 |
| 6,903,564 B1 * | 6/2005 | Suzuki | | 324/762.02 |
| 7,005,871 B1 * | 2/2006 | Davies et al. | | 324/750.3 |
| 7,017,043 B1 | 3/2006 | Potkonjak | | |
| 7,075,284 B2 * | 7/2006 | Watanabe et al. | | 324/76.11 |
| 7,129,800 B2 * | 10/2006 | Gauthier et al. | | 331/175 |
| 7,219,045 B1 * | 5/2007 | Wu et al. | | 703/14 |
| 7,225,375 B2 * | 5/2007 | Cochran et al. | | 714/733 |
| 7,292,968 B2 * | 11/2007 | Wu et al. | | 703/13 |
| 7,495,519 B2 * | 2/2009 | Kim et al. | | 331/44 |
| 7,587,590 B2 * | 9/2009 | Yamada et al. | | 713/161 |
| 7,904,755 B2 * | 3/2011 | Patel | | 714/37 |
| 2003/0135380 A1 * | 7/2003 | Lehr et al. | | 705/1 |
| 2003/0204743 A1 * | 10/2003 | Devadas et al. | | 713/200 |
| 2004/0149816 A1 | 8/2004 | Tomoeda et al. | | |
| 2005/0229060 A1 * | 10/2005 | Cochran et al. | | 714/733 |
| 2006/0049886 A1 * | 3/2006 | Agostinelli et al. | | 331/175 |
| 2006/0221686 A1 * | 10/2006 | Devadas et al. | | 365/185.03 |
| 2007/0075792 A1 * | 4/2007 | Liu | | 331/57 |
| 2007/0132523 A1 * | 6/2007 | Newman | | 331/175 |

(Continued)

OTHER PUBLICATIONS

European Search Report for European Application No. 10 15 6500, European Patent Office, The Hague, Netherlands, mailed on Jul. 6, 2010.

(Continued)

*Primary Examiner* — Jacob C. Coppola
(74) *Attorney, Agent, or Firm* — Schwabe, Williamson & Wyatt, P.C.

(57) ABSTRACT

Techniques are generally disclosed for using an operating entity, including a method, apparatus, and/or system to control usage of the operating entity. In various embodiments, an in-use signal generator may be configured to generate at least one in-use signal, with the at least one in-use signal having a signal duration representative of at least one usage episode of the operating entity. An aging circuit may be coupled to the in-use signal generator and configured to output at least one age-affected signal in response to the at least one in-use signal. A metering module may be coupled to the aging circuit and, in response to the at least one age-affected signal, and configured to measure a signal characteristic of the at least one age-affected signal and translate the signal characteristic into a generated quantity of accumulative usage of the aging circuit.

23 Claims, 11 Drawing Sheets

U.S. PATENT DOCUMENTS

| | | | | |
|---|---|---|---|---|
| 2007/0214255 | A1* | 9/2007 | Spitz et al. | 709/224 |
| 2008/0133833 | A1* | 6/2008 | Watanabe | 711/115 |
| 2009/0300402 | A1* | 12/2009 | Patel | 713/502 |
| 2010/0269150 | A1* | 10/2010 | Potkonjak | 726/2 |

OTHER PUBLICATIONS

Glosekotter P. et al., "Device Degradation and Resilient Computing" Circuits and Systems, 2008. ISCAS 2008. IEEE International Symposium on, IEEE, Piscataway, NJ, USA, May 18, 2008, pp. 828-831.

Tae-Hyoung Kim et al., "Silicon Odometer: An On-Chip Reliability Monitor for Measuring Frequency Degradation of Digital Circuits" IEEE Journal of Solid-State Circuits, IEEE Service Center, Piscataway, NJ, US, vol. 43, No. 4, Apr. 1, 2008, pp. 874-880.

Wei, S. et al., "Malicious Circuitry Detection Using Thermal Conditioning," IEEE Transactions on Information Forensics and Security, vol. 6, No. 3-2, pp. 1136-1145, 2011.

Wolfe, G. et al., "Watermarking Graph Partitioning Solutions," IEEE Transactions on Computer-Aided Design of Integrated Circuits and Systems, vol. 21, No. 10, Oct. 2002.

Kirovski, D. et al., "Local Watermarks: Methodology and Application to Behavioral Synthesis," IEEE Transactions on Computer-Aided Design of Integrated Circuits and Systems, vol. 22, No. 9, pp. 1277-1284, Sep. 2003.

Wong, J. et al. "Fair watermarking using combinatorial isolation lemmas," IEEE Transactions on Computer-Aided Design of Integrated Circuits and Systems, vol. 23, No. 11, pp. 1566-1574, Nov. 2004.

Koushanfar, F. et al., "Behavioral Synthesis Techniques for Intellectual Property Protection," ACM Transaction on Design Automation of Electronic Systems, vol. 10, No. 3, pp. 523-545, Jul. 2005.

Hong, I. et al., "Techniques for Intellectual Property Protection of DSP Designs," ICASSP98 International Conference on Acoustic, Speech, and Signal Processing, pp. 3133-3136, May 1998.

Lach, J. et al., "Signature Hiding Techniques for FPGA Intellectual Property Protection," ICCAD98 International Conference on Computer-Aided Design, pp. 186-189, Nov. 1998.

Qu, G. et al., "Analysis of Watermarking Techniques for Graph Coloring Problem," ICCAD98 International Conference on Computer-Aided Design, pp. 190-193, Nov. 1998.

Kirovski, D. et al., "Intellectual Property Protection by Watermarking Combinational Logic Synthesis Solutions," ICCAD98 International Conference on Computer-Aided Design, pp. 194-198, San Jose, CA, Nov. 1998.

Rashid, A. et al., "Hierarchical Watermarking for Protection of DSP Filter Cores," IEEE Custom Integrated Circuits Conference, May 1999, pp. 39-42.

Qu, G. et al., "Optimization-Intensive Watermarking Techniques for Decision Problems," DAC-99 36th ACM/IEEE DAC Design Automation Conference, pp. 33-36, Jun. 1999.

Lach, J. et al., "Robust FPGA Intellectual Property Protection Through Multiple Small Watermarks," DAC-99 36th ACM/IEEE DAC Design Automation Conference, pp. 831-836, Jun. 1999.

Hong, I. et al., "Behavioral Synthesis Techniques for Intellectual Property Protection," DAC-99 36th ACM/IEEE DAC Design Automation Conference, pp. 849-854, Jun. 1999.

Qu, G. et al., "Hiding Signatures in Graph Coloring Solutions," Information Hiding Workshop, pp. 391-408, Sep. 1999.

Kirovski, D. et al., "Localized watermarking: methodology and application to operation scheduling," 2000 IEEE International Conference on Acoustics, Speech, and Signal Processing, pp. 596-599, 2000.

Meguerdichian, S. et al., "Watermarking while preserving the critical path," IEEE/ACM Design Automation Conference, pp. 108-111, Jun. 2000.

Qu, G. et al., "Fingerprinting intellectual property using constraint-addition," IEEE/ACM Design Automation Conference, pp. 587-592, Jun. 2000.

Koushanfar, F. et al., "Intellectual Property Metering," Information Hiding Workshop, pp. 81-95, Apr. 2001.

Wolfe, G. et al., "Watermarking Graph Partitioning Solutions," IEEE/ACM Design Automation Conference, pp. 486-499, Jun. 2001.

Megerian, S. et al., "Watermarking Integer Linear Programming Solutions," IEEE/ACM Design Automation Conference, pp. 8-13, Jun. 2002.

Koushanfar, F. et al., "CAD-based Security, Cryptography, and Digital Rights Management," Design Automation Conference, pp. 268-269, Jun. 2007.

Alkabani, Y. et al., "Remote activation of ICs for piracy prevention and digital right management," ICCAD, pp. 674-677, 2007.

Alkabani, Y. et al., "Trusted Integrated Circuits: A Nondestructive Hidden Characteristics Extraction Approach," Information Hiding, pp. 102-117, 2008.

Majzoobi, M. et al., "Lightweight secure PUFs," ICCAD 2008, pp. 670-673, 2008.

Majzoobi, M. et al., "Testing Techniques for Hardware Security," IEEE International Test Conference, pp. 1-10, 2008.

Dabiri, F. et al., "Hardware aging-based software metering," Date 2009, pp. 460-465, 2009.

Beckmann, N. et al., "Hardware-Based Public-Key Cryptography with Public Physically Unclonable Functions," Information Hiding: 11th International Workshop 2009, pp. 206-220, 2009.

Potkonjak, M. et al., "Hardware Trojan horse detection using gate-level characterization," Design Automation Conference, pp. 688-693, Jul. 2009.

Wei, S. et al., "Gate-level characterization: foundations and hardware security applications," ACM/IEEE Design Automation Conference (DAC), pp. 222-227, Jun. 2010.

Potkonjak, M., "Synthesis of Trustable ICs using Untrusted CAD Tools," ACM/IEEE Design Automation Conference (DAC), pp. 633-634, 2010.

Wei, S. et al., "Scalable Segmentation-Based Malicious Circuitry Detection and Diagnosis," International Conference on Computer Aided Design, pp. 483-486, 2010.

Meguerdichian, S. et al., "Device Aging-Based Physically Unclonable Functions," Design Automation Conference (DAC), pp. 288-289, Jun. 2011.

Potkonjak, M. et al., "Differential Public Physically Unclonable Functions: Architecture and Applications," Design Automation Conference (DAC), pp. 242-247, Jun. 2011.

Wei, S. et al., "Integrated Circuit Security Techniques Using Variable Supply Voltage," Design Automation Conference (DAC), pp. 248-253, Jun. 2011.

Meguerdichian, S. et al., "Matched Public PUF: Ultra Low Energy Security Platform," International Symposium on Low Power Electronics and Design, pp. 45-50, Aug. 2011.

Wei, S. et al., "Scalable Consistency-based Hardware Trojan Detection and Diagnosis," The 5th International Conference on Network and System Security, pp. 176-183, Sep. 2011.

Wei, S. et al., "Integrated Circuit Digital Rights Management Techniques Using Physical Level Characterization," ACM Workshop on Digital Rights Management 2011, pp. 3-14, Oct. 2011.

Meguerdichian, S. et al., "Security Primitives and Protocols for Ultra Low Power Sensor Systems," IEEE Sensors 2011, Oct. 2011.

Wendt, J. et al., "Nanotechnology-Based Trusted Remote Sensing," IEEE Sensors 2011, Oct. 2011.

Wei, S. et al., "Robust Passive Hardware Metering," ICCAD 2011, Nov. 2011.

Franklin, M. et al., "Auditable metering with lightweight security," in FC 97, pp. 151-160, 1997.

Naor, M. et al., "Secure accounting and auditing on the web," Computer Networks and ISDN Systems, pp. 541-550, vol. 30, 1998.

Kelsey, J. et al., "A peer-to-peer software metering system," In the Second USENIX Workshop on E-Commerce, pp. 279-286, 1996.

Schroder, D., "Negative bias temperature instability: What do we understand?," Microelectronics Reliability, vol. 47, No. 6, pp. 841-852, 2007.

* cited by examiner

1000 A computer program product

1032 Computer Readable Storage Medium

1034 Programming instructions configured to cause an apparatus to perform at least one of:
    generate at least one in-use signal, with the at least one in-use signal having a signal duration representative of at least one usage episode of the operating entity;
    apply the at least one in-use signal to an aging circuit to generate at least one age-affected signal, the aging circuit including at least one circuit path having at least one circuit component with a parameter performance irreversibly dependent on an accumulative usage of the aging circuit;
    measure signal characteristic of the at least one age-affected signal; and/or
    translate the measured signal characteristic into a generated quantity of accumulative usage of the aging circuit.

Figure 11

USAGE METERING BASED UPON HARDWARE AGING

BACKGROUND

Random threshold mismatches in an array of addressable MOSFETs have been recently used to identify integrated circuits (ICs). The technique leverages on process discrepancies unavoidably formed during fabrication. This technique can also be used for authentication, intellectual property (IP) tagging, and other applications.

Computational security has been the traditional field of study for IP management. IP protection such as software and hardware usage metering are among the problems studied in this field. Cryptography is the practice and study of hiding information and until recently it referred almost exclusively to encryption, such as confidentiality and data integrity. Computational security has an even more broad scope and includes privacy protection, password protection, denial of service, and content usage measuring. IP protection of audio and video artifacts and hardware and software components and systems has gained attention throughout the past few years. The two main methods for measuring the popularity of media channels are sampling and auditing. Sampling may be based on surveys among a representative group of users.

Web page access metering has been addressed by a number of researchers and companies. Techniques have been proposed to uniquely identify users and to compensate for the usage of proxies and caches. Mechanisms for metering the popularity of web-sites have been proposed. Some schemes measure the amount of service requested from servers by clients. Licensing has been the most popular method used for software protection among vendors. Licensing software ensures the vendor with a certain degree of control over the distributed software. For example, licensing software may prevent unauthorized duplication of software packages and licensing is a major enabling component for software distribution.

Currently, the dominating software licensing mechanism is based on the license key concept. A key may be encrypted by using a string of data that contains e.g., a software package identification (ID), its usage constraints (e.g., expiration date), and so forth. The invocation of the software package is done automatically when the appropriate key is provided. A large number of licensing protocols have been proposed. Some involves the using of smart cards.

BRIEF DESCRIPTION OF THE DRAWINGS

Subject matter is particularly pointed out and distinctly claimed in the concluding portion of the specification. The foregoing and other features of this disclosure will become more fully apparent from the following description and appended claims, taken in conjunction with the accompanying drawings. Understanding that these drawings depict several embodiments in accordance with the disclosure and, therefore, are not to be considered limiting of its scope, the disclosure will be described with additional specificity and detail through use of the accompanying drawings. Various embodiments will be described referencing the accompanying drawings in which like references denote similar elements, and in which:

FIG. 11 illustrates an article of manufacture having an example program product in accordance with various embodiments, all arranged in accordance with the present disclosure.

DETAILED DESCRIPTION OF ILLUSTRATIVE EMBODIMENTS

Figure 1:
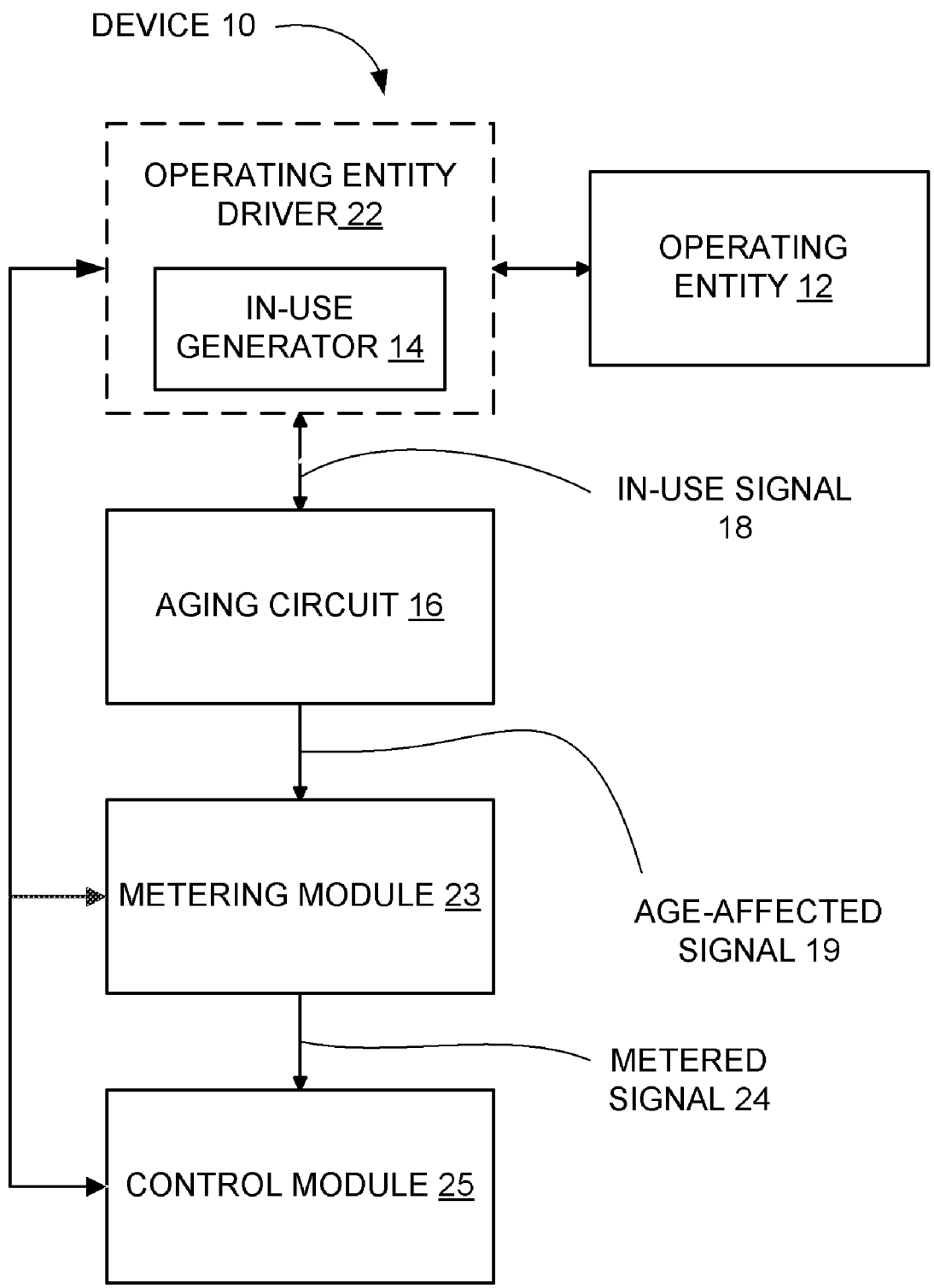
FIG. 1 illustrates an overview of a device having an aging circuit for metering usage of operating entities, in accordance with various embodiments.

The following description sets forth various examples along with specific details to provide a thorough understanding of claimed subject matter. However, it will be understood by those skilled in the art that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm may generally be considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, systems and computer program products related to Hardware, Software, or Content usage Metering (HSCM) based upon hardware aging of one or more components of an integrated circuit or IC (aging circuit), with such aging being reflective of accumulative activity/usage of the component(s).

FIG. 1 illustrates an overview of a device 10 having an aging circuit for metering usage of operating entities, in accordance with various embodiments. As shown, device 10 (or hereinafter, simply device 10) may be arranged to accumulatively meter one or more usage episodes of an operating entity (or simply "op entity") 12, wherein op entity 12 may be a software program (or simply "program"), data set (content, e.g., multimedia) or a hardware unit (e.g., parts manufacturing unit). Hence, for the purposes of this disclosure, the term "operating entity" may be defined to mean a software program, data set (content), or a hardware unit which are operated so as to undergo "usage", or another similarly defined entity. In various embodiments, device 10 may include in-use signal generator 14 (hereinafter "in-use generator") and aging circuit 16 coupled to in-use signal generator 14.

In some embodiments, in-use generator 14 may generate one or more in-use signals 18, where each of in-use signals 18 may have a signal duration substantially matching (and therefore representative of) the duration of one of the usage episodes of op entity 12. More specifically, in-use generator 14 may generate and send an in-use signal 18 to aging circuit 16 during a period of time that an operation is being undertaken, for example, where one of the following operations may be undertaken: (1) processing of one or more software programs by one or more processors; (2) processing of a data set (content) by one or more processors; or (3) operating one or more hardware units. Each such operation, which has a beginning and end, may define a "usage episode" of op entity 12. The term "accumulative usage" may be defined as a sum of one or more usage episodes. 'The terms "accumulative usage" and "usage episode" may be applied to both op entity 12 and aging circuit 16, because as will be described hereinafter, a usage episode of op entity 12 may result in a usage episode in aging circuit 16 and accumulative usage of op entity 12 may result in accumulative usage of aging circuit 16. An accumulative usage and a usage episode may represent a specific period of time and an accumulative period of time, respectively, during which various operations may occur or signals may be generated. The terms "meter" or "accumulatively meter" may be used herein interchangeably. Likewise, the terms "usage", "time of use", and "duration of use" may be used interchangeably herein.

Aging circuit 16, in response to each of in-use signals 18, may generate age-affected signal 19. Age-affected signal 19 may substantially reflect an accumulative usage of aging circuit 16 caused by the in-use signals up through that point in time. In other words, the accumulative time of use amounting to the sum of the time periods of use in which aging circuit 16 may receive in-use signals 18 may represent the accumulative usage (time of use) of aging circuit 16. As will be described hereinafter, age-affected signals 19 may be translated into an accumulative usage of aging circuit 16 in a number of different ways.

In some embodiments, because in-use signals 18 may be generated during usage episodes of op entity 12, use episodes of op entity 12 may result in use episodes of aging circuit 16, with such episodes having substantially the same episode durations. Likewise, accumulative usage of op entity 12 may result in accumulative usage of aging circuit 16, with such accumulative usages having substantially the same accumulative durations.

However, in some of these embodiments, the corresponding durations of op entity 12 and aging circuit 16 do not necessarily have to result in the same durations or be coincident in time, as long as the accumulative usage of aging circuit 16 is proportional or functionally related to the accumulative usage of op entity 12. For example, in some embodiments, a processor may record the durations of the episodes of the op entity 12 and thereafter ratio up or down the period of time that in-use generator 14 generates the in-use signals 18 relative to the durations of the usage episodes of op entity 12. Additionally, the processor may cause in-use generator 14 to delay sending the in-use signals for period of time. Also, the processor may sum some or all of the episode durations of op entity 12 and then cause the in-use generator 14 to generate in-use signals for a period of time reflecting the summed episode durations.

In another embodiment not directed toward accumulative usage, for each usage episode of op entity 12, in-use generator 14 may transmit in-use signals 18 for a fixed period of time. In this manner, the accumulative usage (aging) of aging circuit 16 may reflect the number of usage episodes of op entity 12. Hence, in these embodiments, the signal duration of each of in-use signals 18 may be a fixed duration representing a single occurrence of an episode, whereas in the previously described embodiments, directed toward metering accumulative usage of op entity 12, the signal duration of in-use signals 18 may be a variable duration, reflecting the time of use of op entity 12 during that particular episode. Hence, in these embodiments, age-affected signals 19 from aging circuit 16 may be translated into a number of accumulative starts for op entity 12. The term "accumulative starts" may be used to mean the sum of the usage episodes of op entity 12, when such episodes result in the in-use signals having a fixed duration.

In some embodiments, device 10 may have an operating entity driver 22 (or simply, "op entity driver 22") configured to perform or drive the above described usage operations of op entity 12. The term "op entity driver" may be defined herein to be a mechanism controlling or driving op entity 12 in a manner that may cause such usage of the op entity 12. In some embodiments, op entity driver 22 may: (i) operate on and process instructions of one or more software programs; (ii) operate on or use one or more data sets (content) or (iii) operate a hardware unit. As used herein, "an operating entity driver configured to operate the operating entity" shall be construed to cover all three of these operations. In some embodiments, op entity driver 22 may be a processor. In other embodiments, op entity driver 22 may be a hardwired logic circuit.

Figure 3:
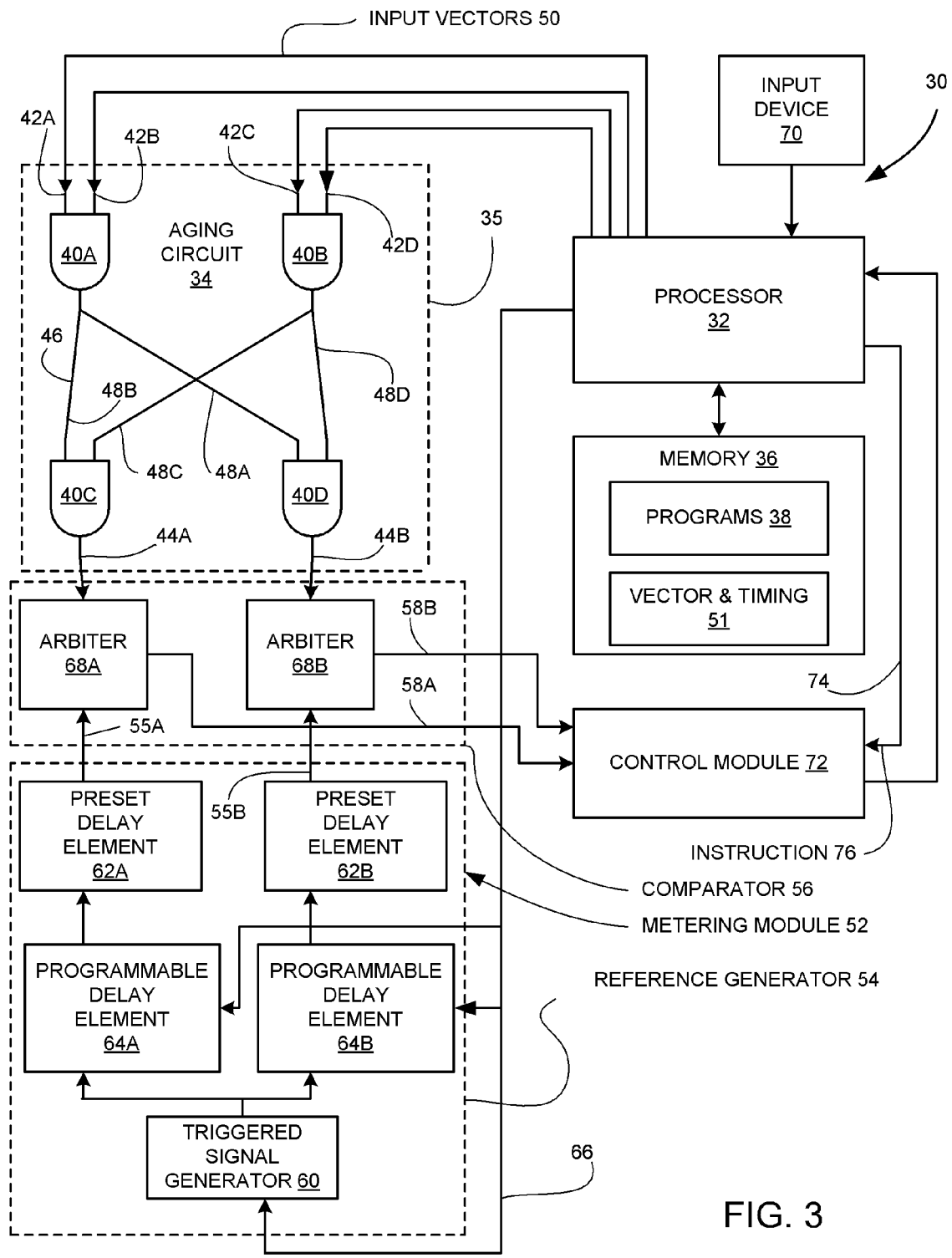
FIG. 3 illustrates an example device for metering a software program; in accordance with various embodiments.
Figure 5:
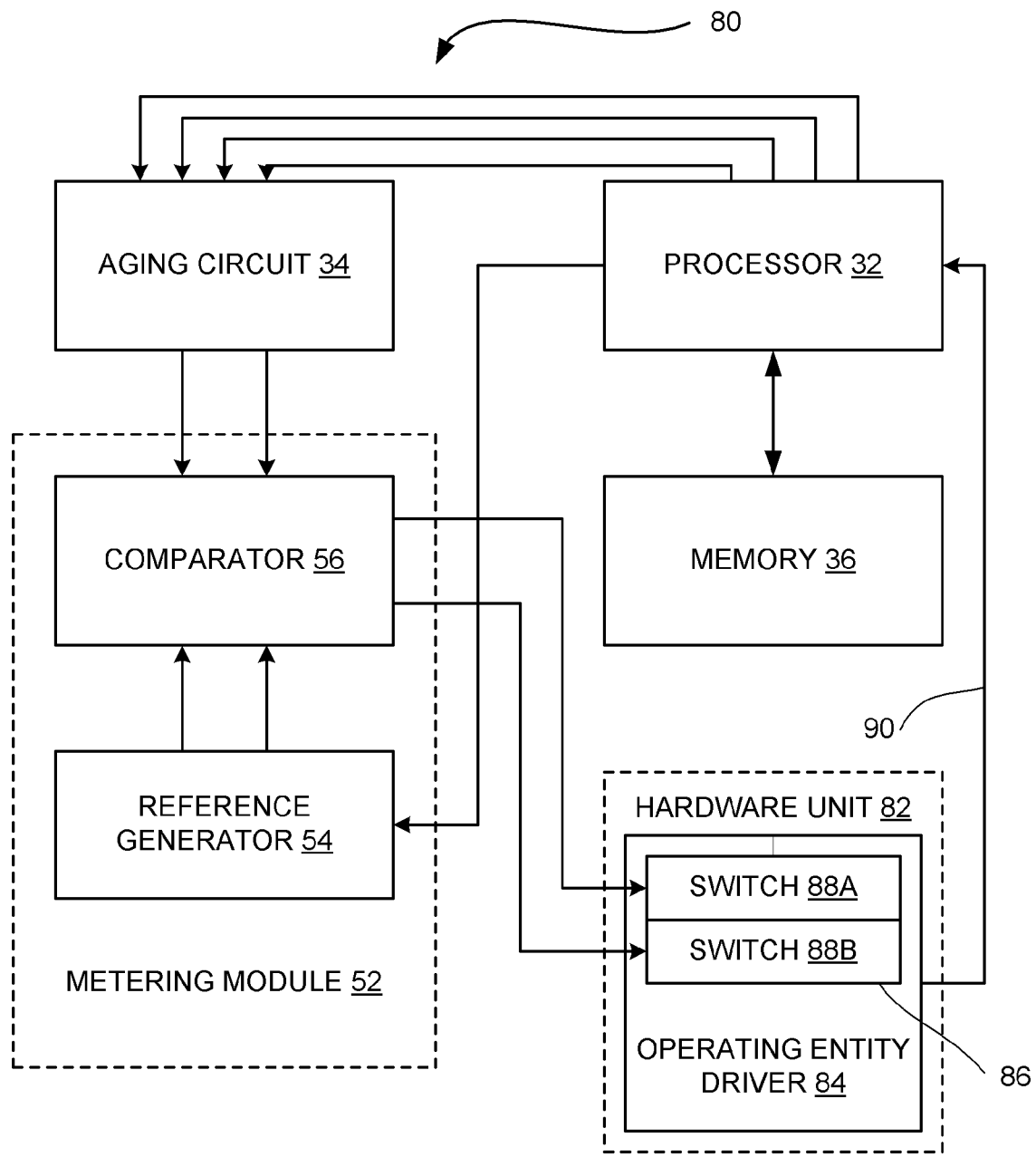
FIGS. 5-7 illustrate an example device for metering hardware usage, data set usage, software program usage respectively, in accordance with various embodiments.
Figure 7:
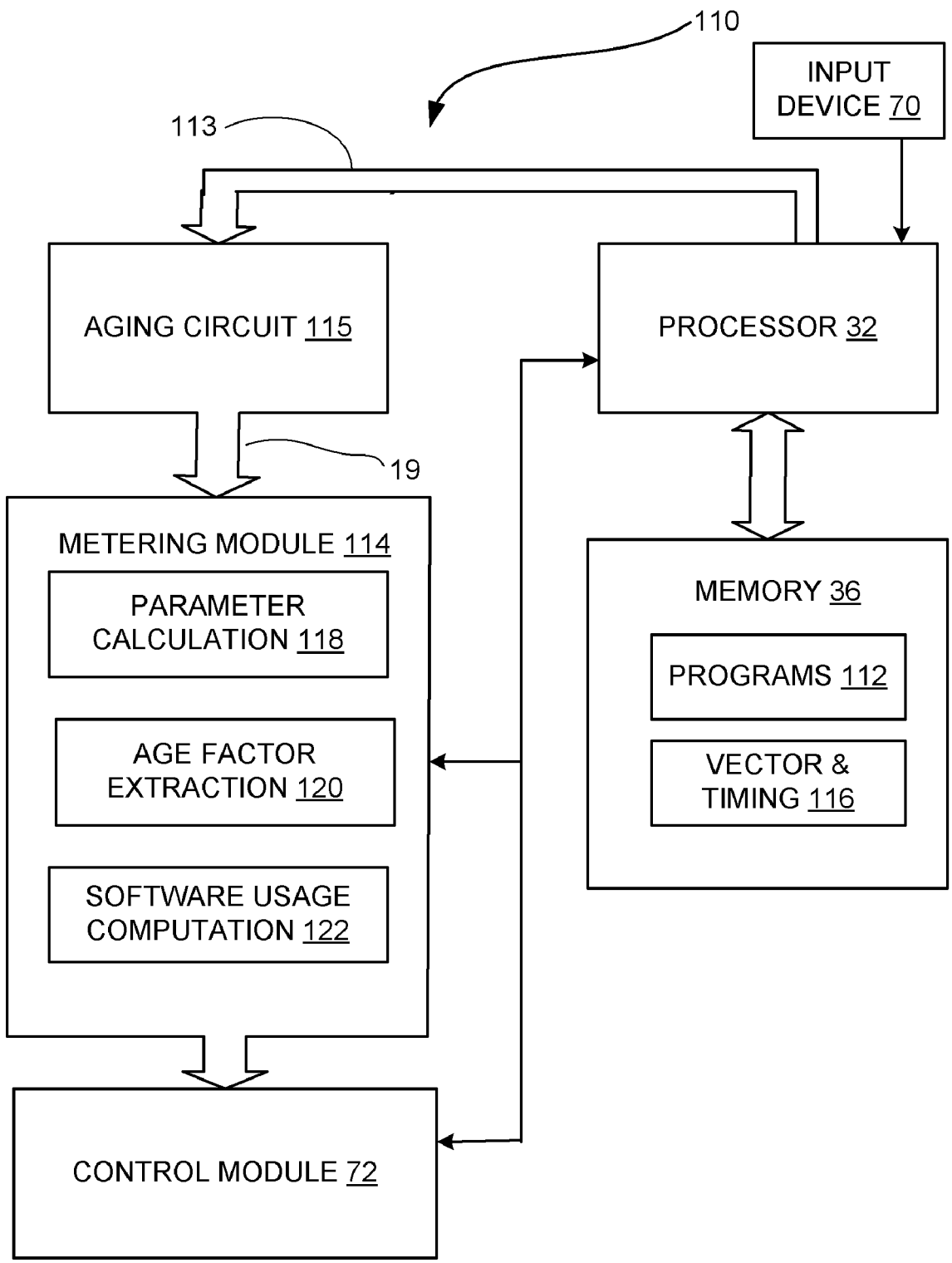

In some embodiments where op entity driver 22 is a processor, this processor may also serve as in-use generator 14, as is the case with the example embodiments illustrated in FIGS. 3, 5 and 7. In other embodiments, in-use generator 14 may be a processor but not op entity driver 22, as illustrated in FIG. 5. In some embodiments, a metered hardware unit, with its associated op entity driver 22 may communicate with the processor acting as in-use generator 14, as illustrated by FIG. 5. However, in other embodiments, in-use generator 14 may be, for example, a simple signal generator that may be activated and/or deactivated to send and stop sending, respectively, and the in-use signals may be based upon signals from some remote device. In yet other embodiments, a simple signal generator may be controlled by a processor, which may or may not be op entity driver 22. In summary, op entity driver 22 may include or may be in communication with in-use generator 14, with op entity driver 22 being configured to operate op entity 12 to generate one or more usages of op entity 12.

In various embodiments, aging circuit 16 may comprise ICs that may be used to meter software, data set (content) or hardware usage based upon measuring one or more aging effects that cause performance changes of aging circuit 16. In a manner previously described, performance changes of aging circuit 16 may substantially correlate with usage of the software, data set (content) or hardware in that aging circuit 16, due to generation of the in-use signal from in-use generator 14 being substantially coincident in time with the usage of the software, data set (content) or hardware.

In the various embodiments, aging circuit 16 may be designed or selected based upon at least one of its circuit components' performance being substantially irreversibly dependent upon its accumulative activity or usage, with such usage resulting in the previously mentioned performance changes. The aging circuit 16 may include at least one circuit path having at least one circuit component. The circuit component may have at least one age-affected parameter or attribute that is subjected to aging affects caused by the accumulative usage, with such aging effects being reflected in age-affected signal 19 from aging circuit 16.

In general, the performance of aging circuit 16 may degrade based upon its usage, with such degradation including, for example, increasing delays or deteriorating power characteristics (e.g., increase in switching power usage and increase in leakage power). However, such performance changes of aging circuit 16 may not be limited to changes causing degradation. In some embodiments, aging circuit 16 may include at least one logic gate or one transistor, both of which are subject to various types of degradations. In other embodiments, aging circuit 16 may include at least one interconnect, which is subject to slowdown as a function of age/usage. In yet other embodiments, aging circuit 16 may incorporate other aging phenomena for usage metering, such as material fatigue, change in frequencies of crystal clocks, loss in ability of flash memory to rewrite data, changes in frequency response of fiber bandwidth, or demagnetizing of some components of magnetic disks. Therefore, the aging circuits, using gates and interconnects, shown in the various embodiments herein are merely illustrative. There are many different circuit components and age-affected component parameters that may be used in aging circuit 16 for metering. Likewise, there are many different circuit structures for the aging circuits 16 that may be used for metering, and the butterfly networks used in the various embodiments herein are merely illustrative of one such circuit structure.

In some embodiments, aging circuit 16 may be predesigned and included in device 10 as a small embedded hardware component solely for performing the HSCM function. In other embodiments, aging circuit 16 may consist of a functional circuit designed and included into device 10 for another function unrelated to the HSCM function (non-HSCM function), thereby allowing aging circuit 16 to be used for both HSCM and non-HSCM functions. For example, aging circuit 16 may be selected from already existing components of a processor that are rarely used for regular operation and/or most suitable for delay or power measurements. Hence, depending upon the embodiment, aging circuit 16 may be either (i) specifically designed for the HSCM function and added to device 10 or (ii) selected from existing functional circuitry in device 10 to serve in implementing the added on HSCM function.

In some embodiments, aging circuit 16 may be a standalone IC. In yet other embodiments, aging circuit 16 may be one or more components of an already existing system, such as a processor. In yet another embodiment, aging circuit 16 may be a component of the IC of hardware unit being metered. In another embodiment where the aging circuit 16 is predesigned, it may be integrated into a Finite State Machine (FSM). Depending upon the embodiment, the illustrated IC components of device 10 may be integrated onto a single chip, comprise multiple chips mounted on a circuit board, or comprise multiple chips in multiple devices or circuit boards.

In the various embodiments, the aging circuit 16 may include one or more circuit paths including one or more circuit components (e.g., gates), as previously mentioned. Each of the circuit components may have a component "parameter" (e.g., gate delay) subjected to aging effects from the accumulative usage of the aging circuit 16. In response to an in-use signal 18, the aging circuit 16 may be arranged to provide one of the age-affected signals 19. The age-affected signal 19 may have a "signal characteristic" reflective of aging effects of the one or more circuit components.

In various embodiments, device 10 may include a metering module 23 coupled to aging circuit 16. Metering module 23, in response to one of the age-affected signals 19, may measure the signal characteristic of the age-affected signal 19 and may translate the signal characteristic into a "generated quantity of accumulative usage" of the aging circuit. The generated quantity of accumulative usage may be referred to as a metered signal 24. The signal characteristic may be either a "signal value" or a "signal change". In a first group of embodiments (e.g., See FIGS. 7-9), metering module 23, in response to one of age-affected signals 19, may measure a "signal change" and translate the "signal change" into "the generated quantity of accumulative usage" of the aging circuit 16. In a second group of embodiments (e.g., See FIGS. 3-6), metering module 23, in response to one of the age-affected signals 19, may measure a "signal value" and translate the "signal value" into a "generated quantity of accumulative usage" of the aging circuit. In the second group of embodiments, prior to measuring and translating the signal value, at least one "correlated data pair" is measured in a test device, as will be described hereinafter. Various terms used in describing the first and second group of embodiments will now be described in more detail.

Each of the one or more circuit paths of the aging circuit 16 may extend from a path input to a path output, with the one or more circuit components of the path circuit being coupled between the path input and the path output. The age-affected signal 19 generated by aging circuit 16 at its path output may reflect performance changes in age-affected component parameters or attributes of the circuit components included in the circuit path. Consequently, age-affected signal 19 may contain at least one signal characteristic (e.g., signal path delay) reflecting the aging of the one or more circuit components in the circuit path of aging circuit 16. Initially, before any aging (and therefore before any accumulative usage of aging circuit 16), signal 19 may be referred to as "non-age-affected signal". After aging (and therefore with some quantity of accumulative usage of aging circuit 16), signal 19 may be referred to as an "age-affected signal". With reference to a signal 20 occurring before a given age-affected signal 20, this is referred to as an "earlier signal" 20. An earlier signal 20 may include an earlier age-affected signal or the non-age-affected signal. In response to receiving an age-affected signal 19, metering module 23 may extract (measure) the signal characteristic. As mentioned above, depending upon the embodiment, the "signal characteristic" may be a signal value of age-affected signal 19 or it may be a signal change in age-affected signal 19. The "signal change" may be a difference between a signal value of age-affected signal 19 and a signal value of the earlier signal. In general, the "signal change" may represent some change (e.g., signal delay caused by the accumulative path delay) of age-affected signals 19 relative to the earlier signal 19.

In the various embodiments, the age-affected circuit components used in the circuit paths of aging circuit 16 may include, but not be limited to, a logic gate, a transistor, an interconnect, a capacitor, a resistor, an inductor or like circuit components that change or age through usage. In the various embodiments, the age-affected component parameters of such circuit components may include, but not be limited to, a gate delay, and an interconnect delay, power consumption or leakage or like component parameter that change or age through usage. In the illustrated examples involving delay, the circuit paths of the aging circuit 16 may be referred to as "delay paths".

In a first group of embodiments (See e.g., FIGS. 7-9), a parameter or attribute calculation sub-module of metering module 23, in a first stage of operation, may extract or measure a signal value of the signal 19 in an initial measurement by applying an in-use signal 18 (vector signal) to aging circuit 16 prior to or at the commencement metering, so as to generate the previously described non-age-affected signal. Thereafter, in subsequent periodically or event driven measurements, metering module 23 may use the parameter or attribute calculation sub-module to measure one or more signal values at one or more longer accumulative usages, so as to generate one or more age-affected signals 19. With each subsequent measurement, a signal change may be calculated from the difference between the signal value of the age-affected signal 19 at a given path output of the aging circuit 16 and the non-age-affected signal for that given path output. Alternatively, a signal change may be calculated from the difference between the signal value of the age-affected signal 20 and the signal value of an earlier age-affected signal 19. This signal change calculation may be undertaken for each of the path outputs of aging circuit 16 so as to create a plurality of signal changes, one for each path output. In the illustrative example of FIGS. 7-9, the circuit components may be gates, and the circuit parameter or attribute may be a gate delay. Consequently, in this illustrative example involving path propagation delay, age-affected signals 19 reflect "path delays" and the signal change are "changes in path delays". Next, the parameter or attribute calculation sub-module, in a second stage of operation, may calculate the individual parameter or attribute values of the individual circuit components. More specifically, in the illustrative example of FIGS. 7-9, the parameter or attribute calculation sub-module may further calculate the gate delays of the individual gates using one of the optimization procedures to be described hereinafter. Further, hereinafter, "parameter" and "attribute" will be used interchangeably.

Once the gate delay of each gate is found, an age factor extraction sub-module of metering module 23, using an aging model, may calculate (and therefore measure) the degree to which each gate has been degraded, and therefore extract how long each individual gate has been under stress. In the above described embodiment from first group of embodiments, all the above calculations may be performed in the device 10. In another embodiment from this group, the non-age-affected signal may be predetermined in a test device. For a number of op entities 12 described herein, this completes the needed calculations for metering module 23.

The above described extraction and translation procedure may include an additional process when op entity 12 may be a metered program and the metered program may be one of a plurality of programs being executed by a processor. In this environment, all the programs may be contributing to the accumulative usage of aging circuit 16 and that portion of the accumulative usage contributed by the metered program may be used to determine the running time of the metered program. In this embodiment, a software usage computation sub-module also may be used.

Figure 8:
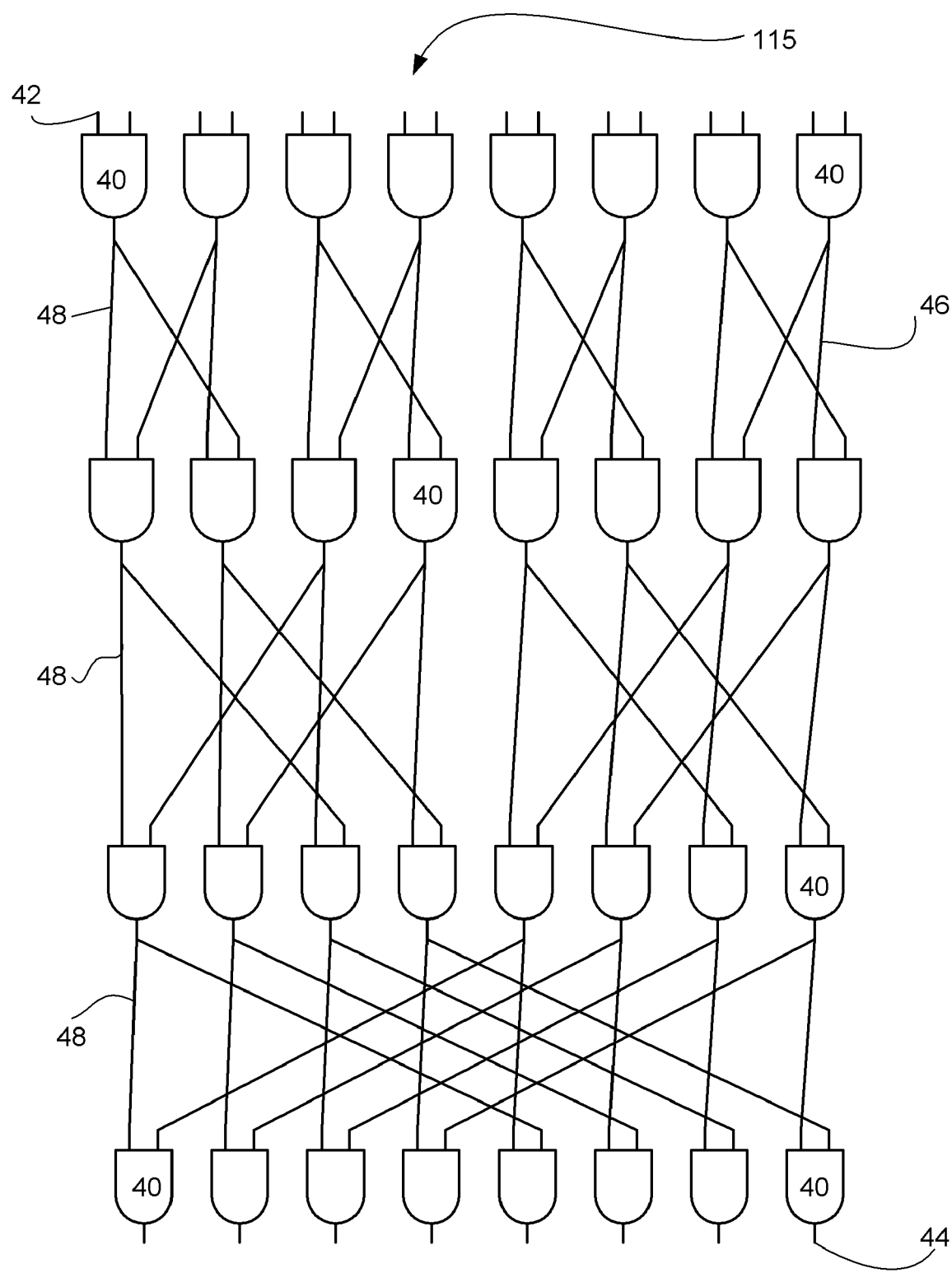
FIG. 8 illustrates an expanded aging circuit, in accordance with various embodiments.
Figure 9:
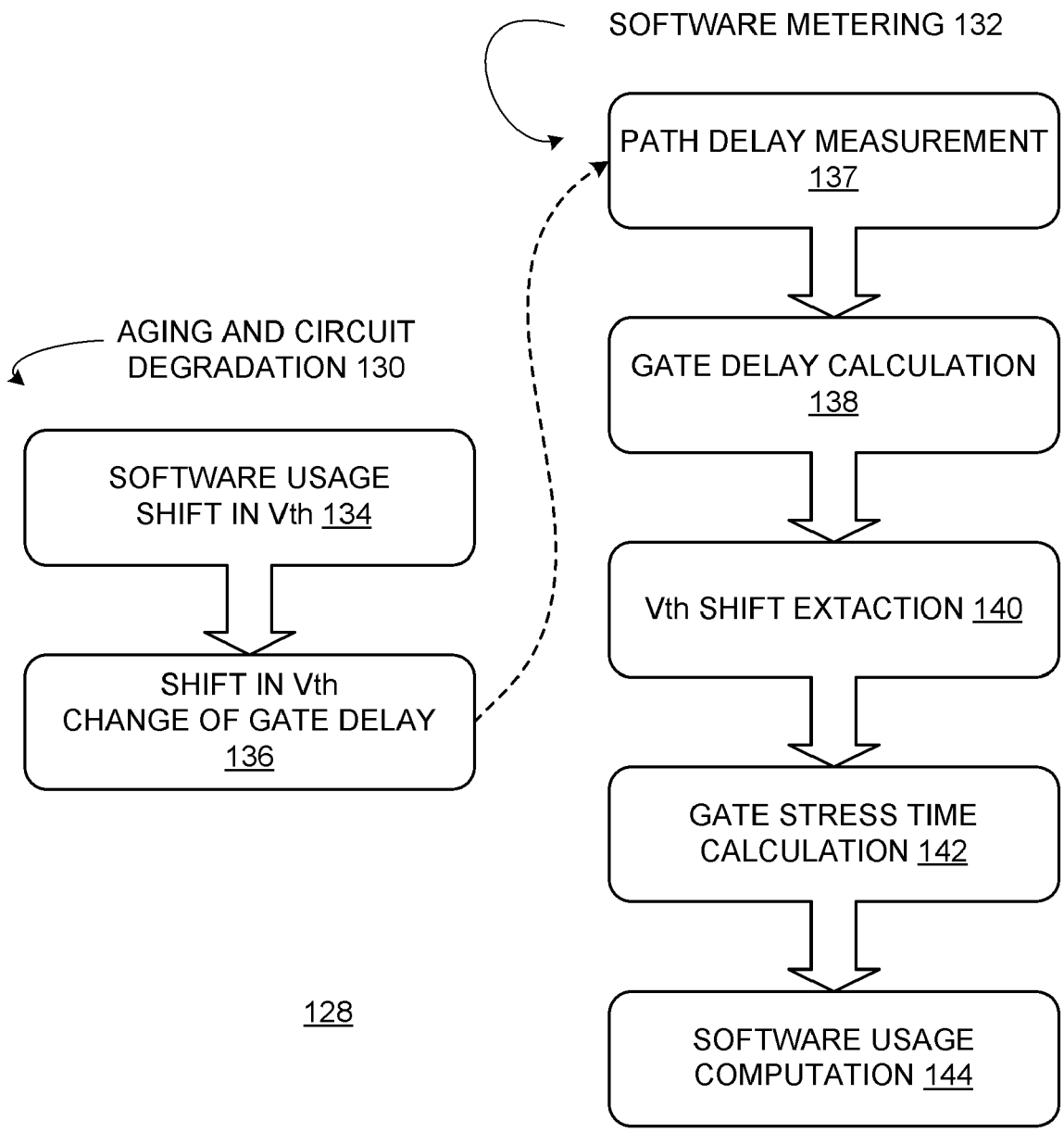
FIG. 9 illustrates an example method using the device of FIG. 7, in accordance with various embodiments.

In one embodiment illustrated in FIGS. 7-9, where aging circuit 16 is a butterfly network, wherein the circuit paths of aging circuit 16 may overlap each other and may, in some examples, be distinguishable (mutually independent) due to each circuit path including a unique subset of circuit components. More specifically, in this embodiment, each circuit component (e.g., gate) may go under stress for some set of programs. A given program may be assigned a unique in-use signal 18, a signature vector, with this signature vector (and therefore given program) contributing to the aging of the subset of circuit parameters. Once the total usage (stress) of each gate or other circuit component is known, through another stage of optimization, individual execution (running) time of the program may be calculated, providing the accumulative usage of the program. Moreover, the accumulative usages of a plurality of programs may be calculated with this sub-module.

In a second group of embodiments (See e.g., FIGS. 3-6), metering module 23 may be arranged to extract and translate a "signal value" instead of a "signal change" of the age-affected signal 19, due in part to one or more measurements being undertaken in a test device. The results of these measurements may be used to set one or more circuit parameters used to measure and translate the signal value of the age-affected signal 19 in the device 10. This approach may allow device 10 to meter op entity 12, based upon the signal values of the age-affected signal, without undertaking the individual component calculations described in the first group of embodiments.

More specifically, an age-affected signal measurement may be performed in a test device having the same parameters and signal characteristic performance as device 10. An example method may start with a "preselected quantity of accumulative usage", which represents the quantity of accumulative usage the device 10 may undertake before generating an event-driven metering signal. For example, the preselected quantity may represent the allowed licensed usage of op entity 12. Thereafter, the test device may be continually used by receiving in-use signals until the quantity of accumulative usage of the test device reaches the threshold of the preselected quantity. At this point in time, a signal value of the age-affected signal may be measured, thereby establishing a "correlated data pair" including (i) a signal value for the age-affected signal and (ii) a preselected quantity of accumulative usage. In other words, to implement one threshold value in device 10, e.g., the preselected quantity of accumulative usage, prior knowledge of one correlated data pair is needed to calculate a circuit parameter of device 10. The correlated data pair may be measured in a test device and then reflected by component parameters set or adjusted in the device 10, as will be described with respect to FIG. 3.

It should be noted that the preselected quantity of accumulative usage may be used to measure the signal value of the age-affected signal in the test device, reversing the order used in the device 10. In the test device, various ways may be used to measure the signal value of age-affected signal, including a digital oscillating test approach described with reference to FIG. 9 or a programmable delay element adjustment approach described in FIG. 3.

With respect to the second group of embodiments, one embodiment using a programming delay element may allow for increasing the quantity of accumulative usage the device 10 undertakes before generating an event-driven metering signal. Hence, a number of correlated data pairs may need to be measured in the test device. A sufficient number of measured correlated data pairs may establish a "predetermined calculated relationship" between (i) the measured signal values of age-affected signals 19 and (ii) the quantities of the accumulative usage of aging circuit 16. Then one or more selected correlated data pairs may be selected from this predetermined calculated relationship to set one or more thresholds of accumulative usage in the device 10. Thereafter, in device 10, the age-affected signal may be continuously measured and upon the measured signal value of the age-affected signal 19 reaching a preselected signal value of the correlated data pair, the measured signal value may be translated into an event-driven metering signal representing a threshold quantity of accumulative usage.

When a "quantity of accumulative usage" is caused by the in-use signals, then it may be referred to as a "generated quantity of accumulative usage". Threshold quantities of accumulative usage to which the generated quantity of accumulative usage may be compared, may be referred to as a "preselected quantity of accumulative usage", "additional quantity of accumulative usage" or like terms.

As mentioned, the above-defined correlated data pair measured in the test device may be used to calculate one or more circuit parameters of one or more circuit components for the device 10. For example, in the embodiment of FIG. 3, a correlated data pair may be used to calculate delay values introduced into the delay elements (a circuit component) used in a reference signal generator. In this example embodiment, triggering an event-driven metering signal may mean that aging circuit 16 has exceeded the preselected quantity of accumulative usage, which is the same preselected quantity used in the test device. More specifically, the delay values of the delay elements may be set so that the reference signal generator may generate a measuring signal that reflects the preselected quantity of accumulative usage. When age-affected signal 19 from aging circuit 16 just exceeds this measuring signal provided by a reference signal generator, the event-driven metering signal may be generated. Thus, the generation of this event-driven metering signal measures the signal value of age-affected signal 19 (e.g., occurrence of a delayed logic-level change) by generating this event-driven metering signal. Also, this generation of the event-driven metering signal translates the measured signal value into a generated quantity of accumulative usage, the preselected quantity of accumulative usage, because generation of the metering signal means that the preselected quantity was reached (and slightly exceeded).

With respect to this second group of embodiments, it should be noted that although a signal value of an age-affected signal 19 is described as being measured and translated, in effect a signal change value may be inherently measured and translated. This is because the calculated delays introduced into the measuring signal presuppose the signal 19 starting at a non-age-affected signal output (no accumulative usage) and then progressing to the pre-calculated age-affected signal 19 (representing the preselected quantity of accumulative usage); hence, a signal change. However, in the device 10, this non-age-affected signal may not be explicitly measured in these embodiments, nor does its signal value need to be known.

In some, but not all embodiments, device 10 may include a control module 25 which may provide some form of control over op entity 12 in response to the metered signal 24 (e.g., accumulative usage or starts) from metering module 23. For example, in some event-driven embodiments, device 10 may further include a control module 25 coupled to metering module 23 to receive an event-driven metering signal representative of a usage measurement for op entity 12. The control module 25 may also be coupled to op entity driver 22 to control the operation of op entity driver 22 or the usage of op entity 12 by op entity driver 22, in response to the event-driven metering signal. More specifically, the control module 25 may be arranged to automatically disable or enable either (i) op entity driver 22 or (ii) usage op entity 12 by op entity driver 22, based upon the event-driven metering signal. In some embodiments, the control module 25 may accomplish this by controlling the operation of op entity driver 22, including but not limited to enabling/disabling op entity driver 22. In other embodiments, the control module 25, in communication with op entity driver 22, may prevent one or more of the programs 18 from undertaking further execution.

In one illustrative application for a control module 25 for various event driven embodiments, digital rights may be licensed for a given quantity of accumulative usage of op entity 12. In some embodiments, metering module 23, using a programmable delay element, may increase the measuring signals based upon remote authorization, by way of receiving an additional usage signal, e.g., after paying for additional usage. Again, more delay time is translated into a larger quantity of accumulative usage for op entity 12. In other event driven embodiments, the control module 25 may be arranged to disable or enable a hardware unit without affecting the operation of a processor, as will be illustrated in FIG. 5.

In the various embodiments, aging circuit 16, metering module 23 and the control module 25 (if included) may be implemented as a Finite State Machine (FSM), which may provide additional security to prevent tampering. A number of applications are mentioned herein which may make use of such a FSM implementation. For example, reliable and verifiable hardware, software and content usage metering (HSCM) may be applicable to wide segments of e-commerce including intellectual property and digital rights management. In one illustrative licensing implementation wherein a licensor licenses op entity 12 (e.g., programs, data sets, or hardware units) to a licensee, the licensee may have an existing device 10 having op entity driver 22 (e.g., processor and memory). In addition to providing op entity 12 to the licensee as a licensed product, the licensor also may provide the FSM (aging circuit 16, metering module 23, and control module 25), along with a vector and timing program (shown in FIGS. 3 and 7) to be stored in a memory and, in some embodiments, executed by op entity driver 22. For example, the vector and timing program may include program instructions for op entity driver 22 (e.g., processor) which caused op entity driver 22 to provide: (i) the in-use signals to the FSM (aging circuit 16), (ii) the timing signals to the FSM (metering module 23) and (iii) in a program metering embodiments, program instructions of the metered program to the control module 25. For other applications and/or for different operating entities 12, metering module 23 and control module 25 may take a number of forms, including both hardwired logic circuits and processor-executed programs. In yet other applications, there may be a metering module 23, but no control module 25.

With respect to example end uses of various embodiments, device 10 may be used for measurement of usage of a specific hardware unit or a subset of hardware units. Additionally, device 10 may use event driven enabling/disabling of the specific hardware units or the subset of hardware units. In other embodiments, device 10 may be used for measurement of usage of a specific program or a subset of programs. Additionally, device 10 may use event driven enabling/disabling of a specific program or a subset of programs. In some embodiments, aging circuit 16 may be used for measurement of usage of a specific data set (content) by a specific program or a subset of programs. For example, such a data set (content) may be an audio or video file. Additionally, device 10 may use event driven enabling/disabling of a specific data set by a specific program or a subset of programs.

Figure 2:
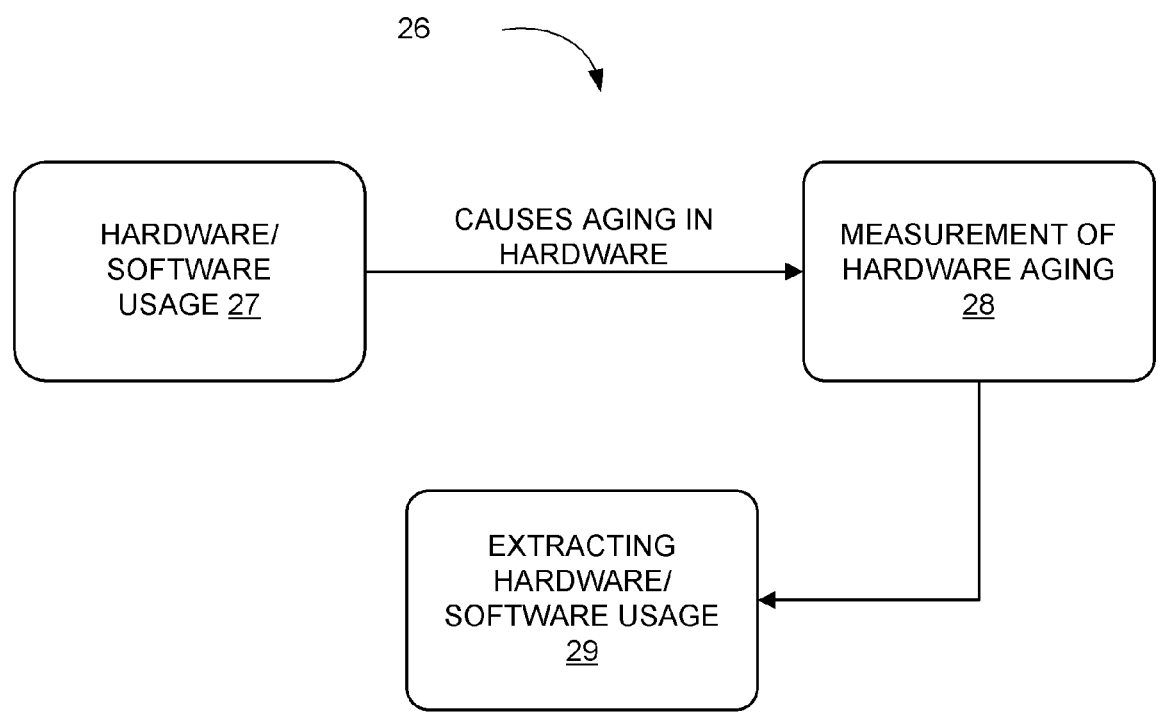
FIG. 2 illustrates a method of using the generalized device of FIG. 1, in accordance with various embodiments.

FIG. 2 illustrates a method 26 of using the generalized device of FIG. 1, in accordance with various embodiments. As shown, method 26 may include operation 27, hardware and software usage. In operation 27 (hardware and software usage), accumulative usage of aging circuit 16 by in-use generator 14, in some embodiments, may be coincident in the time with the accumulative usage or accumulative starts of various operating entities 12, such as: (i) hardware, (ii) software programs, or (iii) content (e.g., multimedia data), with such operating entities 12 being operated by op entity driver 22. Such accumulative usage of aging circuit 16 may cause aging of the hardware, i.e., aging of circuit components of aging circuit 16.

Additionally, method 26 may include operation 28, measurement of hardware aging. In operation 28 (measurement of hardware aging), metering module 23 may undertake a measurement of an age-affected signal characteristic of the age-affected signals 16. Further, method 26 may include operation 29, extracting hardware/software usage. In operation 29, metering module 23 may translate the measurement of signal characteristic into a generated quantity of accumulative usage for aging circuit 16. The generated quantity in turn represents the accumulative usage or starts of the operating entities 12; hence, this operation results in the extracting of hardware/software usage of op entity 12. The extracted accumulative usage data generated by the aging circuit 16 may be used in a number of applications, as will be described herein.

FIG. 3 illustrates an example device 30 for metering usage one or more programs, in accordance with various embodiments. Device 30 may include a processor 32 and an aging circuit 34. Aging circuit 34 may be added for the purpose of software or data set usage metering. In some embodiments, aging circuit 34 may be coupled to processor 32, with processor 32 being coupled to a memory 36. The processor 32 may be configured by the instructions of one or more program(s) 38 stored in the memory 36. In some embodiments, the aging circuit 34 may be used to meter accumulative usage or starts of a single program 38. In other embodiments, the aging circuit 34 may meter accumulative usage or starts of a given program 38 even though a plurality of programs 38 may be executed by the processor 32, as will be illustrated with respect to this embodiment. In some embodiments involving programs 38 using content (e.g., multimedia data set), the processor 32 also may process or control a data set by controlling the programs 38. In some other embodiments described hereinafter in FIG. 6, such control of a data set may be accomplished by disabling a portion of the memory 36. The processor 32, for example, may be an application specific or programmable processor.

In the illustrative embodiment of FIG. 3, op entity 12 of FIG. 1 comprises one of more programs 38. The aging circuit 34 may be made small for the purposes of illustration and, for example, may comprise a 2-by-2 butterfly network 35, which may include four logic gates: gate 40A, gate 40B, gate 40C, and gate 40D. In some embodiments, the gates 40 may be NOR or XOR gates, for example. It should be noted that the gates 40 in FIGS. 3 and 4 are illustrated with a generic gate symbol, which is not intended to be an AND gate. The aging circuit 34 may have four inputs 42A-D (two inputs for each gate 40A or 40B) and has two outputs 44 (one output for each gate 40C and 40D). Each of outputs of gates 40A and 40B may be coupled to both gates 40C and 40D via wires/links 46. The aging circuit 34 defines four delay paths 48, each of which includes two gates 40. More specifically, delay path 48A may include gates 40A and 40D, delay path 48B may include gate 40A and 40C, delay path 48C may include gates 40B and 40C, and delay path 48D may include gates 40B and 40D In one embodiment of the aging circuit 34, the circuit components used for metering are the gates 40 and the age-affected parameter of the gates 40 being used for metering is gate delays. Propagation delays may be measured by measuring the timing or occurrence of logic-level changes. More specifically, the age-affected signals generated at the outputs 44 of the aging circuit 34 have logic-level changes that are delayed by the path delay, which includes all the gate delays of the gates 40 that are in that path. In general, the more gates in a given delay path, the greater the delay of that path should be; hence, measuring delay changes due to usage (aging) may be enhanced with the inclusion of more gates 40 in a given delay path 48. In this embodiment, the wires 46 interconnecting the inputs and outputs of the gates 40 do not meaningfully contribute to the delays of the delay paths 48.

In an alternative embodiment of the aging circuit 34, special wires, which will be referred to herein as "interconnects" are used for wires 46. In this embodiment, the circuit components used for metering are the interconnects and the age-affected parameter of the interconnects may primarily be resistance of the interconnect wires. As the interconnects age, their resistance increases, for example, by becoming non-uniformly wide. Non-uniformly wide interconnects have substantially more resistance than uniformly wide interconnects. The increase in resistance due to aging cannot be reversed.

Regardless of whether the circuit components used for metering is the logic gates or the interconnects, the switching of the illustrated aging circuit 34 (which will be described hereinafter) remains the same. However, it should be noted that these two circuit components, gates and interconnects, are merely illustrative. There are many different circuit components and age-affected parameters that may be used in the aging circuit 34 for metering. Likewise, there are many different circuit structures that may be used, and the illustrative butterfly network is merely one example of an aging circuit 16. For example, when a metered program is one of a plurality of programs being executed, instead of using the butterfly network, each of the circuit paths (e.g., delay paths) of aging circuit 34 may be independent, separate circuits with a plurality of circuit components (e.g., gate). In other words, unlike the butterfly network, the aging circuit 34 has no overlapping circuit paths. To the extent the aging circuit 34 is shown in FIG. 3, this is the case.

In some embodiments, in-use signals 18 of FIG. 1 may become input vectors 50 in FIG. 3, where device 10 may be used to meter a particular program 38 when the processor 32 is executing two or more programs 38. These input vectors 50 may be fed in parallel to the inputs 42 of the aging circuit 34 while a given program is being executed. In some embodiments, the input vectors 50 may include alternately applied signature vectors and all-zero vectors. For each program 38, a unique signature input vector 50 may be assigned to the program 38. Detailed discussion of sequence selection for input vectors and the order of application of the input vectors are provided in the discussion of the embodiment of FIG. 7. While a program 38 is being run on the device 10 of FIG. 1, the input vector 50 may be fed constantly to aging circuit 34.

This feeding of input vector 50 may cause Direct Current (DC) stress to a subset of gates 40 in the aging circuit 34 and may cause degradation and aging of the corresponding gates 40. A vector and timing program 51, stored in memory 36, may be executed to generate the input vectors 50 while the given program 38 being metered is executed.

Metering module 23 of FIG. 1 may take the form of an event driven metering module 52 of FIG. 3. Referring to FIG. 3, the metering module 52 may include: (i) a reference signal generator 54 (hereafter, "reference generator 54") configured to generate one or more measuring signals at outputs 55A and 55B; and (ii) a signal comparator 56 (hereafter "comparator 56"), coupled between the aging circuit 34 and the reference generator 54, to generate an event-driven metering signal at outputs 58A and 58B in response to receiving age-affected signals on the outputs 44A and 44B of the aging circuit 34 and measuring signals from the outputs 55A and 55B of the reference generator 54.

In some embodiments, the reference generator 54 may include a triggered signal generator 60 and a plurality of preset delay elements 62, with there being one preset delay element for each output of the aging circuit 34. Hence, two preset delay elements 62A and 62B are illustrated in FIG. 3. In some embodiments, a programmable delay element 64 may be interposed between the triggered signal generator 60 and the preset delay elements 62. In other embodiments, this programmable delay element 64 may not be included.

The triggered signal generator 60 may be coupled to the processor 32 to receive a trigger signal 66. The triggered signal generator 60, in response to the trigger signal 66, may generate at its output a triggered reference signal. In some embodiments, the processor 32, in executing the vectors and timing program 51, may send the trigger signal at the same time as it starts sending the input vectors 50 and may send a deactivation signal upon stopping the sending of the input vectors 50, with the deactivation signal stopping the triggered signal generator 60 from generating the triggered reference signal. The triggered reference signal may have the same frequency as the input vector 50 and may provide a logic level change for each cycle by comprising a serial sequence of 10101010 and continuing until the input vectors 50 cease. Even though a given output of the aging circuit 34 may not have a logic level change, this does not matter because the comparator 56 may continue to output a zero.

Starting with the assumption that the input vector 50 and the trigger signal 66 are started at the same time by the processor 32, in order to prevent an event-driven metering signal (zero to one transition) from the comparator 56, the delay of the preset delay elements 62 may be set to counterbalance (i) non-age related gate delays in the delay path and (ii) added age-related gate delays calculated to exist at some specified level of accumulative usage of the programs, less any delays introduced by the reference generator 54. With the appropriate preset delay of the preset delay elements 62, the desired measuring signal is generated at the output of the reference generator 54. Of course, when the programmable delay element 64 is used, then part of the delay added to compensate for the added age-related gate delays may be provided by it. In some embodiments, the preset delay elements 62 may be used to compensate for the net of non-age related delays in the aging circuit 34 and the reference generator 54, leaving the programmable delay element 64 to deal with the added age-related gate delays calculated to exist at some specified level of accumulative usage of the metered program.

In an alternative embodiment, the processor 32 may perform the various functions of the reference generator 54, thereby eliminating the reference generator 54 (and the trigger signal 66) and any delay associated with the triggered signal generator 60 and simplifying the above-described balancing of delays. In this embodiment, the processor 32 may directly provide the previously-described measuring signal to the inputs 55 of the comparator 45, with the processor 32 providing the desired signal transition delay to the measuring signal which reflects the preselected quantity of accumulative usage. However, the embodiment using the reference generator 54, when it is implemented as a part of FSM, may be less tamper proof and provide better security for a number of applications described herein. In an alternative embodiment, a hardwired-signal generator may be used in place of the processor, in which the functions of the vector and timing module may be hardwired.

The comparator 56 may include an arbiter 68 for each output 44 of the aging circuit 34; hence, two arbiters 68A and 68B are shown in FIG. 3. The arbiters 68 may be coupled between the preset delay elements 62 of the reference generator 54 and the outputs 44 of the aging circuit 34 to receive the measuring signals from the reference generator 54 and the age-affected signals from the aging circuit 34, so as to generate an event-driven metering signal when one or the age-affected signals are received after the one of the measuring signals. More specifically, the output of the arbiters 68 may be zero as long as it's received age-affected signal does not exceed its received measuring signal. However, the output of the arbiters 68 may transition to one upon its received age-affected signal exceeding its received measuring signal, with the one representing an event driven signal, with the event driven signal being provided at the output 58 of the arbiter 68.

In some embodiments, but not all embodiments, the reference generator 54 may include the programmable delay element 64, which may be used to adjustably increase the amount of delay added to the triggered reference signal and therefore to the measuring signal. In one embodiment, the amount of variable and adjustable delay of the programmable delay element 64 may initially be substantially zero, with the reference generator 54 relying principally on the delays of the preset delay elements 62. Then in response to remote authorization through an input device 70, the processor 32 may increase the amounts of the variable delays of the delay elements 63. For example, in one application, when the user of the device 30 needs more accumulative usage of a licensed program 38, the owner of the program 38 may provide authorization via the input device 70, for example, after an additional payment. For example, the input device 70 may provide a port for communications to a remotely located owner. For example, the port may be coupled to a signal bearing communication medium including but not limited to a fiber optic cable, a waveguide, a wired or wireless communications link, etc.

In other applications, the programmable delay element 64 may provide one way to generate the predetermined calculated relationship for converting a value of age-affected signal into a quantity of accumulative usage for the aging circuit 34. The preset delay elements 62 may be preset to match the gate delays of the un-aged gates, less the delay of the triggered signal generator. Thereafter, a metered program 38 may be progressively used so as to increase the accumulative usage of the aging circuit 34, while progressively aging of the aging circuit 34 through its processing of the vector signals. While recording the progressively increasing quantities of accumulative usage of the program 38, at a given time or various times (e.g., some periodic time period), the variable and adjustable delay in the programmable delay element 64 may be progressively increased until the event-driven metering signal is outputted (transition high). Upon that the event-driven metering signal being generated, the value of the variable delay and the quantity of the accumulative usage of the aging circuit 34 at the same point in time may be recorded. By tracking the outputs 58 of the arbiters 68, such information may be obtained for each of delay paths 48 having a transitioning output. By doing this at a number of locations for each delay path 48, a graph (function) of variable delay values versus accumulative usage may be developed for each delay path 48. Hence, the predetermined calculated relationship may be established by this technique implemented in a test device and thereafter the resulting delay values may be used to set the amount of delay of the preset delay elements 62, and when present and needed, the programmable delay element 64 of the aging circuit 34.

Although the comparator 56 is shown implemented to compare logic-level changes (signal transitions) of two signals when other signal values are being compared, other comparator arrangements may be used, such as amplitude comparison.

In some embodiments, a control module 72 may be included, with the control module 72 being coupled to the outputs 58 of the arbiters 68 to receive the event driven signal and coupled to the processor via line 74 to receive the instructions of the program being executed. The outputs of each of the arbiters 68 (outputs of the comparator 56) may be logically combined (e.g., XORed) with the next instruction 76 of the metered program 38 that is being executed on the processor 32. As long as the output from the arbiter 68 is zero, the instruction 76 may be returned to the processor 32 for execution. However, once the output of the arbiter 68 transitions to one (creating the event driven signal), the one may be logically combined (e.g., XORed) with the instruction 76, which may turn the instruction 76 into junk (i.e. an unusable or incorrect instruction), with the junk being returned to the processor 32 and thereby terminating the execution of the metered program 38.

In some embodiments, one arbiter 68 may be utilized to generate the event-driven metering signal (transitioning to one) to cause the program 38 to stop execution. However, in other embodiments, additional logic may be added to the control module 72 to require more than one arbiter to generate an event driven signal before terminating the operation of the program 38. In some embodiments, the comparator 56, the reference generator 54, and the control module 72 may be implemented as a Finite State Machine (FSM). In some embodiments, the device 30 may not include the control module 72.

Figure 4A:
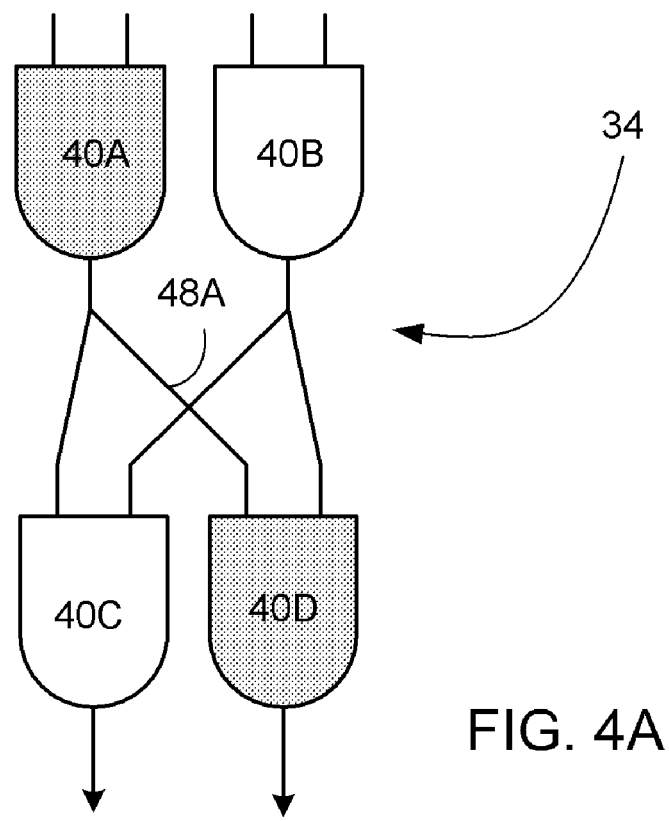
FIGS. 4A and 4B illustrate operation of an aging circuit of FIG. 3, in accordance with various embodiments.
Figure 4B:
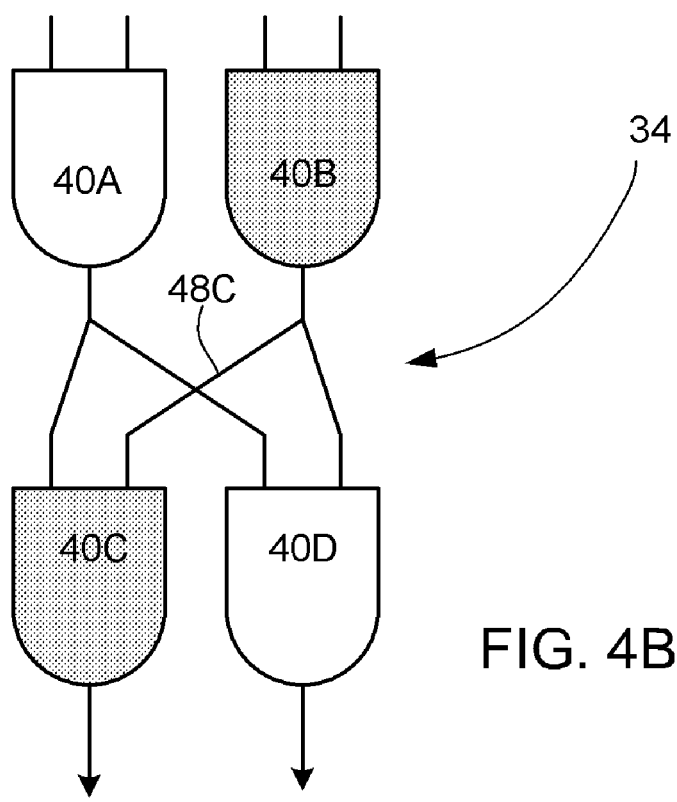

FIGS. 4A and 4B illustrate operation of an aging circuit 34 of FIG. 3 in accordance with various embodiments. Operation of aging circuit 34 will be described in the context of the metering of two programs 38. In some embodiments, at least one correlated data pair may be premeasured in a test device, with a preselected signal value of the age-affected signal correlating with a preselected quantity of accumulative usage. To increase the accumulative usage, more than one correlated data pair is needed, as previously described with respect to the device 10 of FIG. 1. In some embodiments, in the case with more than one program being executed, each program may be assigned one of the circuit paths in the aging circuit 34 which do not overlap, i.e., logic gates are not used by more than one program. However, in more complex implementations of the aging circuit 34 (as will be discussed in the embodiment of FIG. 7) wherein signal changes are measured (e.g., path delay changes), logic gates in the aging circuit may be used by multiple programs and all that may be needed is a unique subset of gates being assigned to each program (therefore providing mutually independent delay paths), with a metering module including computational analysis for resolving overlapping usages of the logic gates. When there is one program being executed or in the special case of hardware usage metering (all functional software may be considered as a single program), there are no issues with respect to overlapping usage of a given logic gate. In this case, the aging circuit 34 may have a single circuit input and a single circuit output.

Referring to FIG. 1 and FIGS. 4A and 4B, some, but not necessarily all, of the outputs 44 of the aging circuit 34 may undergo logic-level changes (logic transitions from 0 to 1 or 1 to 0) in response to the input vectors 50, which may be received during the execution of the metered program 38. For a given delay path 48, a logic-level change at its input 42 of the delay path 48 may work its way to the output 44 of the delay path 48, with the logic-level change incurring the gate delays of the two logic gates 40. As the aging circuit 34 ages due to usage by the input vectors 50, the delays of these logic gates 40 increase, leading to an increase in the path delay for any given delay path 48. Likewise, depending upon the structure and size of the aging circuit 34, this same logic-level change starting at one of the inputs 42 may work its way through multiple delay paths 48. However, in the simplified example provided in FIGS. 4A and 4B, a given logic-level change may work its way down a single path 48.

As shown in FIG. 4A, assume that a first input vector 50 associated with a first program 38 causes a logic-level change at one of the inputs of gate 40A. In turn this logic-level change triggers another logic-level change at the gate 40D; hence, in this case a logic-level change may be characterized as having worked its way from an input to an output over path 48A, so as to change the output 44B of the gate 40D. No signal transition is received by arbiter 68A from the output 44A of the aging circuit 34; hence, its output 58A remains zero. On the other hand, the arbiter 68B may receive a signal transition in the generated age-affected signal received from the output 44B of the aging circuit 34 and a signal transition in the measuring signal from the reference generator 54. As long as the single transition of the generated age-affected signal is received second, the arbiter 68B may continue to generate a logic zero signal at its output. In some embodiments, the transition of the first input vector 50 and the transition of the triggered signal generator 60 may be generated substantially coincident in time. In the event that the aging of the gates 40A and 40D introduces a delay to the signal transition of the generated age-affected signal which is greater than the preset delay of the preset delay element 62B (and also, if present, the delay of the programmable delay element 64), then the output of the arbiter 68B may transition high (logic one) to generate the event driven signal.

As shown in FIG. 4B, assume that a second input vector 50 associated with a second program 38 causes a logic-level change at one of the inputs of gate 40B. In turn, the logic-level change for gate 40B triggers another logic-level change at the gate 40C; hence, in this case a logic-level change may be characterized as having worked its way from an input to an output over path 48C, so as to change the output 44A of the gate 40C.

In practice, the aging circuit 34 may be substantially larger than the illustrated simple 2 by 2 butterfly network, so as to increase the number of delay paths and the number gate delays of each delay path. For example, an 8 by 4 butterfly network may have 16 inputs, 8 delay paths and outputs, one 4 levels of gates. Such a butterfly network may generate up to 8 age-affected signals, with each such signal being affected by 4 gate delays. In other embodiments, the aging circuits 34 may include one or more circuit paths, with each of the circuit paths including an independent plurality of serially connected circuit components. For example, the circuit path may include a plurality of logic gates coupled in series, with one input gate held to logic zero and the other input receiving the output of the prior logic gate (except for the first gate in the series, which may receive the age-affected signal). The at least one circuit path may be associated with at least one metered program. In other words, the input vectors for that metered program may be applied to that particular circuit path. In other embodiments, a plurality of circuit paths may be associated with a plurality of metered programs.

Referring again to FIG. 3, in some embodiments, metering module 52 may be configured to accumulatively meter the one or more usage episodes of a metered program 38, based upon the measured signal value of age-affected signals being translatable into a quantity of accumulative usage of one of the circuit paths of the aging circuit 34 (and therefore the metered program 38), with the accumulative usage being caused by the input vector signals 50. In some embodiments, the accumulative usage of aging circuit 34 may substantially equal the accumulative usage of metered program 34, with such accumulative usages representing periods of operating time. This substantially equal relationship may be accomplished a period of generating the input vector signals 50 having a variable duration lasting as long as the duration of the usage episode. However, in other embodiments, the accumulative usage of the aging circuit may be altered to be substantially proportionate to an accumulative usage of op entity 12. For example, for each usage episode, the op entity driver 22 may direct processor 34 to have a period of generating the input vector signals 50 with a variable duration that is some multiple of the duration of the usage episode. In an alternative embodiment, the signal duration of each of periods of generating the input vectors 50 may have the same fixed duration, with this fixed duration being representative of an occurrence of one of the usage episodes. In this case, the accumulative usage of aging circuit 16, divided by the fixed duration, is substantially equal to the number of usage episodes.

FIG. 5 illustrates an example device 80 for metering hardware usage, in accordance with various embodiments. Device 80 as illustrated includes a hardware unit 82 that is controlled by metering. Those components that remain the same as shown and described in FIG. 3 will retain the same reference numbers and will not be described again. The components that remain the same include the processor 32, the aging circuit 34, the memory 36, and the metering module 52, which may include the reference generator 54 and the comparator 56.

An operating entity driver 84 (op entity driver 84) may operate and control the hardware unit 82. The op entity driver 84 may include a control module 86. The control module 86 may include two switches 88A and 88B which may be coupled to the outputs of the comparator 56 to receive the event-driven metering signal from one or both of the arbiters (not shown). In this illustrative embodiment, upon either switch 88A or 88B receiving an event-driven metering signal, the switch 88A or 88B may cause the op entity driver 84 to disable the hardware unit 82. The op entity driver 84 may send to the processor 32 a request over the line 90 to initiate the previously described operations of the aging circuit 34 and the metering module 52.

In this embodiment, op entity driver 22 of FIG. 1 may correspond to the op entity driver 84 in FIG. 5 and op entity 12 of FIG. 1 may correspond to the hardware unit 82 in FIG. 5. Like the embodiment of FIG. 3, the op entity driver 84 (the processor 32 in FIG. 3) may be arranged to operate the op entity. However, unlike the embodiment of FIG. 3 where the op entity driver (as defined in FIG. 1) is the processor 32, in this embodiment the processor 32 and the op entity driver 84 may be separate components, which may be in communication with each other. This difference arises because the op entity (as defined in FIG. 1) is the hardware unit 82 which has its own op entity driver.

Figure 6:
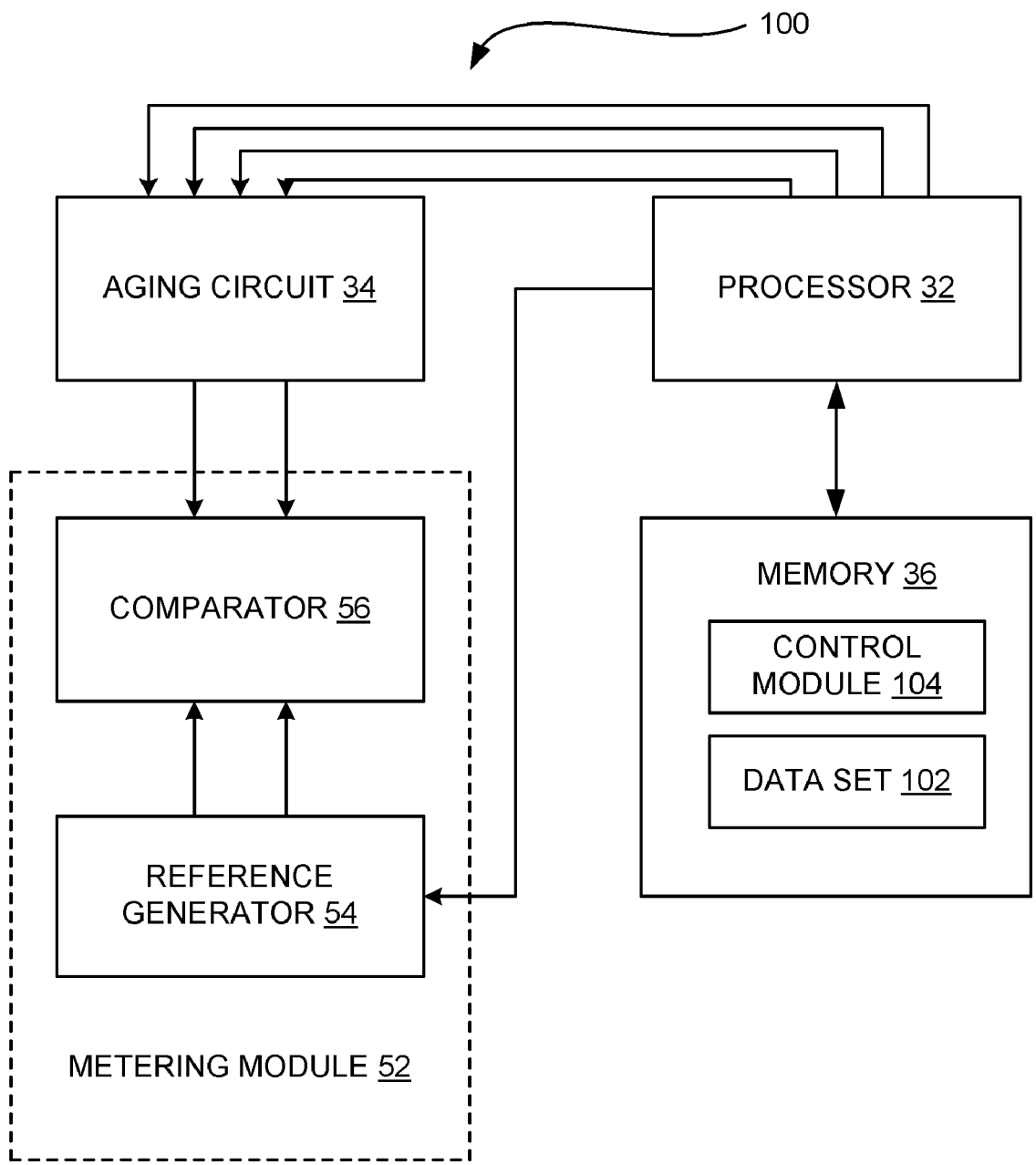

FIG. 6 illustrates an example device 100 for metering data set usage, in accordance with various embodiments. Device 100 is illustrated as an embodiment where a data set (content) 102 may be controlled by metering. Those components that remain the same as shown and described in FIG. 3 will retain the same reference numbers and will not be described again. The components that remain the same include the processor 32, the aging circuit 34, the memory 36, and the metering module 52, which includes the reference generator 54 and the comparator 56. In this example embodiment, a control module 104, a software routine, may be contained in memory 36 and may be executed by the processor 32. The control module 104 may be used to enable or disable that portion of the memory containing the data set. In this example embodiment, op entity driver 22 of FIG. 1 may correspond to the processor 32 in FIG. 6 and op entity 12 of FIG. 1 may correspond to the data set 102 in FIG. 6.

FIG. 7 illustrates an example device 110 for metering program usage, in accordance with various embodiments. The operation of the device 110 being shown in FIG. 9. The device 110 is illustrated for an op entity 12 of FIG. 1 consisting of one or more selected programs or one or more data sets, where the processor 32 may be executing a plurality of programs. However, the device 110 may be used to monitor any one of the op entity devices 12 described in this disclosure, merely by simplifying the calculations hereinafter provided. Moreover, such simplified calculations of the method of FIG. 9 may provide a process for determining the "predetermined calculated relationship" for the embodiments for FIGS. 3-6, with such a process being used on different, test devices to generate one or more correlated data pairs for use in these embodiments.

In this illustrative example of the device 110, the device 110 may be described as: (i) used for software metering of a single executed program in a processing environment wherein multiple executed programs are contributing to the aging of the aging circuit 115; and/or (ii) having a predesigned, CMOS base aging circuit 115, which may use gate delays as the aging phenomena for metering and may have a plurality of gates connected in such a way that the activities of the gates depend upon the executed programs. In some embodiments, the device 110 may be applied to the application of providing digital rights/intellectual property protection by controlling usage of the metered program. Hence, some references may be made to this application; however, this device 110 may be used in other applications, several of which are mentioned herein. However, these aspects are intended to be illustrative and many other variations are possible.

Referring to FIG. 7, components that remain the same with the embodiment of FIG. 3 may include the processor 32, memory 36, and input device 70 and control module 72, if included, and will not be described again. In this embodiment, the processor 32 may execute the plurality of programs 112, with one or more of the programs being individually metered. The processor may provide signature vectors 113 to the aging circuit 115. In this embodiment, op entity 12 of FIG. 1 may correspond to the plurality of programs 112, with operating driver 22 corresponding to the processor 32. In the device 110 the processor 32 may be coupled to the memory 36. Additionally, a vector and timing routine 116 may be included in the memory 36 and executed by the processor 32, to provide input vectors to the aging circuit 115 and timing signals to the metering module 114, as will be described in detail hereinafter.

The control module 72, which again may include an Exclusive OR, may again XOR instructions from the processor 32 and disable the processor 32 when an event-driven metering signal may be received from the metering module 114. This may occur when the metering module 114 determines that the generated quantity of the accumulative usage from the aging circuit 115 exceeds a preselected quantity of the accumulative usage, i.e., reaches a predetermined threshold. As with the other embodiments, the control module 72 may take many different forms and for some applications, may not be included.

The metering module 114 may include three sub-modules, a parameter calculation sub-module 118, an age factor extraction sub-module 120, and a software usage computation sub-module 122. The metering module 114 may be coupled to the outputs of the aging circuit 115 to receive the age-affected signals 19, which may reflect performance changes in age-affected component parameters of the circuit components of the aging circuit 115.

The vector and timing program 116 may be used to assign unique input vectors to each of the programs, may initiate sending and stopping the in-use signals to the aging circuit 115 while one of the programs 112 are being executed, and may coordinate the activities of the metering module 114 and the processor 32. It should be noted that all impact of the program being metered is stopped before measurement of the increase in delays of the aging circuit 115 in order to have no interference from the metered program. Still, the measurements may be done while the metered program is running because the metered program does not have to use the aging circuit 115 in each clock cycle. Instead, the metered program may use it, say, every 10 or every 100 cycles. So, interleaving may be used when the signal value measurements are done and when additional aging is induced. For example, in cycle 10 $i$+1 ($i$=1, . . . ), the metered program may use the aging circuit 115 and the metering module 114 may conduct measurements may in cycles 10 $i$+2, 10 $i$+3, . . . .

With reference to FIG. 8, in order to make the process of HSCM feasible, in this illustrative embodiment, the aging circuit 115 of FIGS. 7 and 8 may be a predesigned aging circuit, which may enable accurate measurement of degradation and software/hardware usage. More specifically, in FIG. 7, the aging circuit 115 as illustrated in FIG. 8 may take the form of an expanded butterfly network which includes a network of gates having a butterfly topology. Similar architectures are sometimes used for Fast Fourier Transform (FFT) calculations. Since this butterfly network is merely an expanded illustration of the illustrated simple example shown in FIGS. 3, 4A and 4B, it will retain the same reference numbers and its operation will not be explained again. For example, as shown in FIG. 8, one butterfly network may have sixteen inputs 42, four levels and eight outputs 44. Each of the outputs of gates 40 on all but the last level may be coupled to two gates 40 on the next lowest level via wires/links 46. Each path 48 may contain four gates 40. Butterfly networks may be used as the aging circuit 115, since there are exponentially large number paths and because the structure may include mutually independent paths. Furthermore, the structure is scalable, as will be described hereinafter. The gates 40 are represented in FIG. 8 with a generic gate symbol, which is not intended to be an AND gate.

Referring to FIGS. 7 and 8, the parameter calculation sub-module 118 may be arranged to measure the delays of several delay paths 48, with each of the delay paths 48 extending from one of the inputs 42 of the aging circuit 115 to one of the outputs 44. From these measured path delays, the parameter calculation sub-module 118 may be arranged to calculate the gate delays of the individual gates 40 using optimization techniques to be described hereinafter.

Once the delay of each gate 40 is determined, the age factor extraction sub-module 120, using the aging models, may be arranged to calculate (and therefore measure) the degree to which each gate 40 has been degraded, and therefore extract how long each individual gate 40 has been under stress. For some embodiments, the value of stress may define the generated quantity of accumulative usage of the aging circuit 115. This may be the case with the prior embodiments of FIGS. 3-6; hence, for these embodiments, this may be all the calculations that are needed.

However, in this embodiment illustrated for the device 110 (See FIG. 7), the delay paths 48 (See FIG. 8) may overlap each other and may be distinguishable (mutually independent) due to each delay path 48 including a unique subset of gates 40. Hence, to extract the accumulative usage of one of the programs, where a plurality of programs are contributing to the accumulative usage of the aging circuit 115, the software usage computation sub-module 122 may be used.

More specifically, in this embodiment, each gate 40 may go under stress for some set of programs 112 (identified as programs $S_i$ in the calculations provided hereinafter). Since a program $S_i$ has a unique signature vector $\rho_i$, it contributes to the aging of a subset of gates 40 in the aging circuit 115. Once the total usage (stress) of each gate 40 is known, through another stage of optimization to be provided hereinafter, individual execution (running) time of program $S_i$ is calculated, providing the accumulative usage of the program $S_i$. Moreover, the accumulative usages of a plurality of programs $S_i$ may be calculated with this sub-module. To examples of these calculations are provided hereinafter in the description of the method of FIG. 7. In summary, the accumulative usage of one of the programs 112 may be a calculated portion of the accumulative usage of the aging circuit 115.

Referring again to FIG. 7, as background, some technical challenges of the new e-commerce security approach may be: (i) creation of the input to the aging circuit 115 for each software package or program (or dataset) that facilitate the reconstruction; (ii) extraction of the increase of the delay of each gate and calculation of corresponding time of usage for each gate in the presence of measurement and aging model errors; and (iii) in some applications, development of hardware mechanisms that are resilient to physical and other security attacks for enforcing software digital right management. In some embodiments, it may be desirable to design an aging circuit 115 having the property of being able to reconstruct from the aging of its gates, how often each of a number of input vectors is applied.

Referring generally to FIGS. 7-9, the HSCM techniques hereinafter may use a multi-stage optimization problem of computing the delays of gates, their aging degradation factors, and finally the licensed program usage using, for example, convex programming. In some embodiments, a method may be used for measuring delays or other characteristics of gates, transistors, interconnects, or other components of the circuitry by creating system of equations where each equation may correspond to a single or multiple measurements after application of a pair of input vectors. With respect to solving the system equation of this method, in some embodiments, the following programming may be used: convex programming, linear or piece-wise convex programming, and nonlinear programming. The method may also be used for simultaneous control of the time limited usage of k sets of data using the aging circuit 115. The method may also be directed for control of the time limited usage of one or more sets of programs or data using plurality of additional circuitry on the same IC. In some embodiments, the time interval of authorized hardware, software, or data use may be processed using maximum likelihood or some other statistical procedure for improved reliability and accuracy. As will be discussed hereinafter, the statistical procedure may be a maximum likelihood and convex programming procedure, a maximum likelihood and linear programming procedure, a convex programming procedure, and a linear programming procedure.

The propagation delay of a CMOS based digital gate can be expressed as:

$$d = \frac{C_L V_{dd}}{I_d} = \frac{C_L V_{dd} L_{eff}}{\mu C_{ox} W_{eff} (V_{gs} - V_{th})^\alpha} \quad (1)$$

where $\alpha$ is the velocity saturation index, $V_{dd}$ is the supply voltage, $C_L$ contains the lumped capacitance of the load including parasitic capacitance and other parameters are technology dependant constants. $C_{ox}$ is the per-unit area capacitance of the oxide layer, $L_{eff}$ and $W_{eff}$ are the effective gate length and width, $V_{th}$ is the threshold, $V_{gs}$ is the gate to source voltage, $I_d$ is the drain current, and u is a constant. Using Equation 1, the delay degradation, $\Delta d$, for a given gate can be derived as:

$$\frac{\Delta d}{d_0} = \frac{\alpha \Delta V_{th}}{V_{gs} - V_{th}} \quad (2)$$

where $d_0$ is the original delay of the gate without any $V_{th}$ degradation, and can be extracted from third-party time analysis tools.

Negative bias temperature instability (NBTI) causes circuit aging which will introduce a shift in $V_{th}$ over time. The shift in the transistor threshold voltage, $\Delta V_{th}$, can be derived using analytical models. With respect to how does $V_{th}$ degrade as the aging circuit 115 is being used, there are several studies which cover this issue thoroughly and model the aging of digital circuits. For example, an analytical model of NBTI degradation has been introduced which relates $V_{th}$ degradation to usage time as follows:

$$\Delta V_{th} = K_{C \times \alpha S} S_i^{2/3} \times t^{1/6} \quad (3)$$

which illustrates the power dependency of $V_{th}$ degradation with a fixed time exponent of 1/6. In this illustrative embodiment, Equation 3 is the basis of the hardware-aging metering, since it relates gate usage time (stress) to $V_{th}$ shift. When a gate is being used it means that it is under either Direct Current (DC) or Alternating Current (AC) stress. Hence, "gate usage time" and "stress time" may be used interchangeably in this description.

As previously mentioned, device 10 of FIG. 1 may perform hardware, software and component metering (HSCM), but this embodiment illustrates on how much a piece of software, e.g., a specific program, is used in the device 110. For this application, it is assumed that there is a set of k programs (applications, components . . . ), $\Sigma = \{S_1, \ldots S_k\}$, where each software $S_i$ is run multiple times for an unknown arbitrary time $t_i$. The objective is to find the times $t_i$s efficiently with accuracy in the presence of measurement errors and imperfect degradation models.

In this example embodiment, the aging circuit 115 of FIGS. 7 and 8 may be a especially structured circuit composed of logic gates which under NBTI age in a way that gate degradation may be measured effectively. Every program $S_j$ may be associated with a unique input vector $\rho_i$. Whenever that program is used, the corresponding input vector will be fed to the aging circuit 115 and causes DC stress on a unique subset of the gates in the aging circuit 115.

FIG. 9 illustrates an example method 128 for using the device of FIG. 7, in accordance with various embodiments. Method 128 illustrates the NBTI-based aging effect on circuit characteristics of the aging circuit 115 of FIG. 7 and how that information can be extracted and used for software metering using the sub-modules of FIG. 7. The left diagram 130 of FIG. 9, entitled "Aging and Circuit Degradation", represents the high-level physical process of aging, whereas the right diagram 132 of FIG. 9, entitled "Software Metering", shows the stages of utilizing the aging process for software metering. With respect to the left diagram 130 of FIG. 9, at operation 134 (software usage shift in $V_{th}$), the usage of the programs shifts the voltage threshold $V_{th}$. At operation 136 (shift in $V_{th}$ change of gate delay), there is a change in the gate delays of the aging circuit 115 of FIG. 7.

Referring to both FIGS. 7 and 9, execution of the parameter calculation sub-module 118 of FIG. 7 undertakes (i) operation 137, a path delay measurement, of FIG. 9, wherein the delays of several paths from the inputs of the aging circuit 115 to its outputs may be measured and (ii) operation 138, gate delay measurement, where an individual gate delay may be calculated from the path delays using optimizing techniques to be described hereinafter. In some embodiment (e.g., See FIGS. 3-6), obtaining in a test device this signal value, the path delay change, may be sufficient. One or more of these path delay values and their correlated accumulative usage values may be stored and used thereafter in operating a device. However, in this group of embodiments, the measurement of the path delays is just the first operation.

Once the delay of each gate is found, execution of the aging factor extraction sub-module 120 of FIG. 7 undertakes (i) operation 140, $V_{th}$ shift extraction, of FIG. 9, wherein aging models may be used to measure the degree to which each gate has been degraded, and (ii) operation 142, gate stress time calculation, of FIG. 9, wherein how long each individual gate has been under stress (usage) is extracted.

Execution of the software usage computation sub-module 122 of FIG. 7 may undertake operation 144, software usage computation, wherein software metering of a given program may be undertaken. More specifically, each gate may undergo stress for some set of programs. Since program $S_j$ has a unique signature vector $\rho_i$, it contributes to the aging of a subset of gates in the aging circuit 115. Once the total usage of each gate is known, through another stage of optimization, individual execution (running) times of programs may be calculated.

To give more insight into the software metering shown in FIGS. 7 and 9 and to generally show the concept, the method shown in FIG. 9 is explained operation-by-operation on the previously-mentioned simple example, with further reference to the illustrative simplified aging circuit 34 shown in FIGS. FIGS. 3, 4A and 4B, which is a 2 by 2 butterfly network. This butterfly network was described in detail in FIGS. 3, 4A and 4B, and will not be described again. For the purposes of illustration, this example assumes the objective is to measure the usage of two programs $S_1$ and $S_2$. The path delays are assumed to be measured accurately with no error and the degradation model is assumed to be perfect. It should be noted that all these assumptions will be relaxed in the next example (to be described later), wherein the method is generalized to fit realistic assumptions including measurement errors and model imperfections.

Signature input vectors $\rho_i$ and $\rho_2$ are the input vectors associated with programs $S_1$ and $S_2$. For the purposes of illustration, assume the signature vector $\rho_1$ causes DC stress on gates $v_1$ and $v_4$ (gates 40A and 40D, respectively, in FIG. 3A) and signature vector $\rho_2$ causes DC stress on gates $v_2$ and $v_3$ (gates 40B and 40C, respectively, in FIG. 3B). The four gates have initial delays equal to $d_{1_0}$, $d_{2_0}$, $d_{3_0}$, $d_{4_0}$. Assume these two programs $S_1$ and $S_2$ are used several times in arbitrary order. Each time a specific one of the programs is used, its corresponding signature vector is fed to the aging circuit 115 to cause DC stress on corresponding gates in the aging circuit 115.

In the path delay measurement operation 137 of FIG. 9, the path delays of all four possible paths from primary inputs to primary outputs are measured to use for gate delay calculations. The following equations may represent these measurements:

$$d_1+d_3=d_{P13}$$

$$d_1+d_4=d_{P14}$$

$$d_2+d_4=d_{P24}$$

$$d_2+d_3=d_{P23} \quad (4)$$

where d represent the delay of path $<v_i, v_j>$. In the gate delay calculation operation 138 of FIG. 4, the above set of linear equations may be solved using classic Linear Programming (LP) solvers to provide the individual gate delays. In the presence of measurement errors, a noise term may be added to each equation which will be studied thoroughly in a later description of a more complex example. Once individual gate delays are characterized, in the $V_{th}$ shift extraction operation 140 of FIG. 9, Equation 2 may be used to extract the amount of shift in threshold voltage for gate i:

$$\Delta V_{th_i} = \frac{d_i - d_0}{d_0} \frac{V_{gs} - V_{th}}{\alpha} \quad (5)$$

where $d_0$ is the initial gate delay. In the gate stress time calculation operation 142 of FIG. 9, the Equation 3 is used to find the total amount of time that gate i has been under stress:

$$t_i = \left(\frac{\Delta V_{th_i}}{K_C \times \alpha_S S_i^{\frac{2}{3}}}\right)^6 \quad (6)$$

For clarity and simplification of this example, it is assumed the model used in Equation 3 is perfect. Now that how long each gate has been under stress is known, in the software usage computation operation 144 of FIG. 9, how long each program has been used may now be calculated. For instance, let's look at the program $S_i$. The program $S_1$ may be the program which causes stress on gates $v_1$ and $v_4$. A similar situation may exist for program $S_2$ and therefore individual software usage times may be given as:

$$\tau_1 = t_1 = t_4$$

$$\tau_2 = t_2 = t_3 \quad (7)$$

where $\tau_1$ and $\tau_2$ are the usage times (usage data) for programs $S_1$ and $S_2$ respectively.

In the case of metering hardware, operation 144 may not be needed. Hence, hardware metering may be a simplified version of the above example for software monitoring. In some embodiments, but not all embodiments, device 10 of FIG. 1 may further include the control module 25 of FIG. 1 and use the accumulative usages and starts in the various ways described in this disclosure.

In summary, as has been shown in this illustrative example, Hardware, Software and Component Metering (HSCM) may be a multi-step process which involves aging circuit design/selection, signature vector generation, gate delay measurement, aging factor extraction and finally software metering (software usage computation). Hence, this illustrative embodiment may be built on creating and leveraging key connections: (i) the correlation between the switching activity stress on each gate and its delay increase; (ii) the correlation between the inputs to the aging circuit 115 and the stress on each gate; and (iii), in some embodiments, the integration of various components into a finite-state-machine (FSM).

With respect to operations 137 through 144, maximum likelihood formulations and convex programming may be used to optimally solve some of the tasks, as will be described in a more complex example of the illustrative embodiment. The effectiveness of the convex programming indicates that both the circuitry design and input selection are also solved in such a way that the input matrix to the convex programming software has full rank and the delay and aging of each gate may be rapidly calculated. Hence, in some applications, these techniques may assist in the creation of security and digital rights management techniques that leverage hardware aging mechanisms, such as the aging circuit 115, as will be illustrated in the more complex example provided hereinafter.

The butterfly network may be represented by a tuple AG= (G, p, q) where G=(V, E) is the directed graph representing the topology of the network and V and E are the sets representing the gates and connections (edges) in the circuit. Furthermore, p and q are input and output bits of the circuit respectively. For each gate $v_i \in V$ in the aging circuitry, there is a delay d, associated with it. Depending on what inputs are fed into the butterfly network, some of the gates will be under stress and experience aging and degradation caused by NBTI. As previously described, aging causes a shift in threshold voltage and eventually an increase in gate delay. In this embodiment, HSCM may be based on processing the changes in gate delays and extract software/hardware usage.

The selection of aging circuit 115 may affect the HSCM function significantly. A "good" aging circuit may be one that can produce information usable for accurate software, hardware or content metering. Since all the information the illustrative aging circuit 115 may give is embedded inside gate characteristics, especially delay, this illustrative embodiment utilizes a circuit that through standard methods of path delay measurements, individual gate delays may be calculated with high degrees of accuracy even in the presence of measurement noise. Through the usage of path delays, individual gate delays may be extracted under the condition that there exist paths that are less-correlated and therefore inherit more entropy. For instance, if the aging circuit 115 was a set of mutually disjoint paths, no path measurement may be used to extract individual gates in each path. Two candidates that are suitable for gate delay extraction may be circuits with butterfly topology and sorting networks. These networks in practice may generate mutually independent linear equations for path delays which can be used for gate delay extractions.

Referring again to FIG. 8, butterfly networks are isomorphic because they may be represented in different ways by renumbering the gates. Two networks may be isomorphic if there exists a permutation that maps a channel of the first network to a channel in the second one. An N-input butterfly has log(N+1) levels, each with N-nodes, as shown in FIG. 8. Butterfly networks are easy to scale as well, either by increasing the dimensions or through usage of Benes networks. The Benes network is a 2 log(N+1)-level network consisting of back-to-back butterflies. Although Benes networks are usually drawn with the long diagonal edges at the first and last levels rather than in the middle, the networks are isomorphic. Either a larger butterfly network may be used or the circuit may be scaled like Benes networks to achieve more accuracy.

An exact method to extract gate delays may require solving a linear system of equations of size $O(2^N)$, where N is the number of primary inputs. For large circuits with large numbers of primary inputs, the exact method is not computationally feasible. Therefore, |S| number of input configurations may be used where |S| is the number of programs (e.g., applications, components and the like used on device 110 of FIG. 7). Ideally, input vectors may be selected such that the subset of gates under stress corresponding to each vector, and this may result in picking as many paths as possible that are less-correlated and may be used to extract gate delays.

Referring again to FIGS. 7 and 9, for each software $S_i$, a unique input vector $\rho_i$, called 'signature vector', may be assigned to the software $S_i$. While a software $S_i$ is being run in device 10 (or in the device 10 of FIG. 1), the input vector $\rho_i$ may be fed constantly to the butterfly network. This feeding causes DC stress to a subset of gates in aging circuit 115 and cause degradation and aging of the corresponding gates.

In some embodiments, the signature vector 113 may be an m-of-n code. M-of-n codes are a class of binary codes in which exactly m out of n bits are equal to 1. The simplest implementation is to append a string of ones to the original data until it contains m ones, then append zeros to create a code of length n. This class of codes may be used for carrying data over self-timed on-chip interconnect links. Such codes may be chosen to have low redundancy. Hence, m-of-n codes are used as signature vectors in this illustrative embodiment with m≡n/2, which may result in sparse gates under stress for each vector. In some embodiments, a signature vector may be fed in parallel to the aging circuit 115, followed by a vector of all zeros, with the signature vector and the all-zeroes vector alternating over and over again while the program 112 is being executed. In this scheme, certain of the m-of-n codes are used that allow logic-level changes to reach the outputs of aging circuit 115 without suppression—certain symmetrical vectors lead to logic-level change suppressions before reaching the output. In summary, the input vectors 113 may be designed with sequences of binary zeros and ones so that a unique subset of the gates 40 may be utilized for each metered program 38, which in turn may allow for the accumulative usage each program 38 to be calculated. The mathematics for achieving this will be provided hereinafter during the presentation of a method for obtaining the conversion data.

With respect to operation 137 (path delay measurement) of FIG. 9, the processor 32 in FIG. 7 may perform a digital oscillation test on aging circuit 115 (and therefore butterfly network). In order to measure the propagation delay of a path from the input to the output of the butterfly network, one input to the butterfly network may be flipped and a change in the output may be observed. This delay may be measured, and, with backtracking from the output to the input, the path providing the delay is detected.

The delay of each gate in the butterfly network may be measured and computed (e.g. parameter calculation sub-module 118 from FIG. 7) using a set of path-delay measurements in the butterfly network in operation 137 of FIG. 9. The delay of each path p, from one primary input to one primary output may be expressed as:

$$d_{p_i} = \sum_{\forall v_i \in p_i} d_{v_i} \tag{8}$$

where the sum is taken over all the gates in the path $p_i$. It may now be assumed that m distinct path delays similar to Equation 8 may be generated. The set of m measurements may be presented as:

$$d_{p_i} = a_i^T x + v_i, \forall i; 1 \leq i \leq m \tag{9}$$

where $x \in \Re^n$ is a vector of gate delays which is to be estimated, $d_{p_i} \in \Re$ is the measured path delay value and $v_i$s are the measurement errors. It may be further assumed that the measurement errors $v_i$s may be independent, identically distributed (IDD) with a normal distribution. In statistical estimation, a widely used method, called maximum likelihood (ML) estimation, may be used to estimate x as:

$$\hat{x}_{ml} = \operatorname{argmax}_x p_x(d_p) \operatorname{argmax}_x l(x) \tag{10}$$

where $p_x(d_p)$ is the likelihood function of x and $l(x) = \log p_x(d_p)$ is the log of the likelihood function which makes it easier to work with Equation 10. Maximum likelihood estimation (MLE) is a statistical method that may be used to calculate the best way of fitting a mathematical model to some data. Modeling real world data by estimating maximum likelihood offers a way of tuning the free parameters of the model to provide an optimum fit.

The likelihood function in this case may be expressed as:

$$p_x(d_p) = \prod_{i=1}^{m} p(d_{p_i} - a_i^T x) \tag{11}$$

so the log-likelihood function would be:

$$l(x) = \log p_x(d_p) = \sum_{i=1}^{m} \log(p(d_{p_i} - a_i^T x)) \tag{12}$$

The ML estimate may be any optimal point for the problem:

$$\text{maximize:} \sum_{i=1}^{m} \log(p(d_{p_i} - a_i^T x)) \tag{13}$$

When $v_i$'s are Gaussian with zero mean and variance a $\sigma^2$ and density function calculate $p(z)=(2\pi\sigma^2)-\frac{1}{2}e^{-v^2/2\sigma^2}$ the log-likelihood function may be expressed as:

$$l(x) = -(m/2)\log(2\pi\sigma^2) - \frac{1}{2\sigma^2}\|Ax - d_p\|_2^2 \quad (14)$$

where A is the matrix with rows aT/1, aT/2, . . . , aT/m. Therefore the maximum likelihood problem becomes equivalent to the solution of a least-square approximation which can be solved efficiently using convex programming.

In the above approach, $L_2$-norm may be used for optimization. The robustness of $L_1$-norm approximation to large errors in terms of maximum likelihood estimation. $L_1$-norm approximation is interpreted as maximum likelihood estimation with a noise density that is Laplacian; $L_2$-norm approximation is maximum likelihood estimation with a Gaussian noise density. The Laplacian density has larger tails than the Gaussian, i.e., the probability of a very large $v_i$ is far larger with a Laplacian than a Gaussian density. As a result, the associated maximum likelihood method expects to see greater numbers of large residuals and since measurement errors are known to be Gaussian $L_2$-norm is used here.

Global optimization may be described as the task of finding a set of parameters to optimize an objective function. In general, there exist solutions that may be locally optimal but not globally optimal. Consequently, global optimization problems may be quite difficult to solve; in the context of combinatorial problems, since they are often NP-hard. In convex optimization problems, a locally optimal solution may also be globally optimal. These convex optimization problems may include LP problems; and QP problems where the objective is positive definite, if minimizing (and negative definite if maximizing).

Furthermore NLP problems belong to the same class where the objective is a convex function, if minimizing (and concave if maximizing) and the constraints form a convex set. This least-square optimization problem may be described as a special class of convex optimization. Convex optimization problems are far more general than linear programming problems, but they share the desirable properties of LP problems: they can be solved quickly and reliably even in very large size. A convex optimization problem is a problem where all of the constraints are convex functions and the objective is a convex function while minimizing, or a concave function while maximizing. With a convex objective and a convex feasible region, there may be one optimal solution, which is globally optimal. Several methods, notably Interior Point methods, may either find the globally optimal solution, or prove that there is no feasible solution to the problem.

The next operations 140-144 of FIG. 9 may be to extract degradation factors (e.g., $V_{th}$ shift, gates stress, etc.) and software usage using the age factor extraction sub-module 120 and software usage computation sub-module 122 of FIG. 7. This discussion may be divided into two parts: (i) where the aging models are perfect (or ideal) and (ii) where the aging and degradation models are imperfect (or non-ideal) and include errors and uncertainty themselves.

The gate delays measured using the presently disclosed techniques may be used directly to determine individual gate degradation factors; for each gate $v_i$ in the aging circuit 115:

$$\Delta V_{th_i} = \frac{d_i - d_0}{d_0} + \frac{V_{gs} - V_{th}}{\alpha} \quad (15)$$

$$t_i = \Theta(V_{th_i}) = \left(\frac{\Delta V_{th_i}}{K_C \times \alpha_S S_i^{\frac{2}{3}}}\right)$$

$\Theta(\Delta V_{th_i})$ is the function which maps threshold voltage change to usage time (stress time) of each gate. Using perfect aging models, Co is basically an inverse of the function stated in Equation 6.

The last phase of this example for HSCM may be the calculation of software usage, as undertaken in operation 144 (software usage computation) of FIG. 9 with the software usage computation sub-module 122. It is assumed that each program $S_i$ is run for the total amount of $\tau_i$. The total amount of each program's execution (i.e. the accumulated run time) is important and not how that time has been broken over time. In other words, if a software is run for a period of time $T_0$, its effect on aging is equivalent to multiple runs which add up to $T_0$. Furthermore, the ordering of execution among other programs may be irrelevant. In order to see why these clams are in fact true, remember that NBTI is a time dependant aging effect on digital circuits, and the total time that a gate is under stress is what causes the degradation.

Each and every program may cause stress on a specific subset of gates in the butterfly network through its unique input vector. Let's assume for each program $S_i$, the set of gates $\phi_i = \{v_{i_1}, \ldots v_{i_{k_i}}\}$ are the gates which are under stress when program $S_i$ is being run and $k_i$ is the total number of gates which program $S_i$ puts stress on. Therefore, for each arbitrary gate $v_i$, there is a set of programs which may cause stress on it, called $\phi_i = \{S_{i_1}, \ldots S_{i_{r_i}}\}$, where $r_i$ is the total number of programs which may cause stress on gate $v_i$.

Previously, the total stress time on the individual gates in the aging circuit 115 are measured. In this operation 144 (software usage computation) of the HSCM, the individual times that each program has been used may be extracted. A linear programming formulation may be formed as follows: for each gate $v_i$, the total stress time $t_i$ may be substantially equal to the total execution time of programs which cause stress on $v_i$. In other words:

$$\sum_{j=0}^{r_i} \tau_j = t_i \quad (16)$$

where the sum is taken over all the execution times ($\tau_j$) of programs which cause stress on gate $v_i$. The following LP formulation may be used:

$$B\bar{\tau} = \bar{t} \quad (17)$$

where B is the coefficient matrix in which each row represents the coefficients in Equation 16 and $\bar{\tau}$ and $\bar{t}$ are software usage times and gate stress times, respectively.

The structure of the butterfly network and the fact that $|S| < |V|$ enables solving the above LP problem efficiently using classic LP solvers. The solution to Equation 17 results in individual software usage times and finishes the operations of the method shown in FIG. 9.

As one can observe, many other variations can easily be configured to device 10 of FIG. 1. For instance, one other commonly important metric for IP protection and rights management is the number of times a particular program or hardware is used as opposed to the total usage times. In this scenario, the main modification needed to the above described illustrative embodiment is to feed the signature vector for constant duration of time, say $t_c$. Then, the same method as shown in FIG. 9 may be followed and at the end of this method, by dividing $\tau_i$s by $t_c$, the number of times each program is used may be extracted.

Aging and degradation models are continuously under study and researchers develop more accurate models every day. The HSCM method, as described in the various embodiments of the disclosure, may now be generalized to achieve minimum error in software metering in the presence of uncertainty in aging models. Assume that the gate usage time t is a function of $\Delta V_{th}$; t=$\Theta(\Delta V_{th})$ with some uncertainty v. The uncertainty v is a random variable which can possess different probability distributions. The certainty v may be assumed to have a normal distribution. Therefore, usage time for gate i can be expressed as:

$$t_i = \Theta(\Delta V_{th_i}) + v_i \quad (18)$$
$$= \Theta\left(\frac{d_i - d_0}{d_0} \frac{V_{gs} - V_{th}}{\alpha}\right) + v_i$$
$$= \Theta_d(d_i) + v_i$$

$\Theta_d$ is the composition of delay-threshold voltage and threshold voltage-aging functions. Gate usage time is in fact the total running time of programs that cause stress on that gate:

$$t_i = \sum_{j=1}^{j=r_i} \tau_{i_j} \quad (19)$$

The above sum is over all programs in $\phi_i$. Equations 18 and 19 lead to the following set of linear equations with Gaussian noise:

$$t_i = b_i^T \tau + v_i, \forall 1 \leq i \leq k \quad (20)$$

where $b_i$ is the vector which represent which software contributes to $t_i$:

$$b_{ij} = 1, \forall S_j \in \varphi_i \quad (21)$$
$$= 0, \text{otherwise}$$

Equation 21 is similar to Equation 9 and may be solved in a similar fashion. Due to uncertainty and imperfections in aging models, the aging models may possess different properties and probability distributions. Therefore, different uncertainty models can be incorporated in this formulation and be solved accordingly. The solution to a set of equations in Equations 20 is the running times of programs which completes the methods presented herein. At this stage, a remote activation scheme may be used that aims to protect ICs (IC) and intellectual property (IP).

Referring to FIGS. 7-9, in one illustrative embodiment, the aging circuit 115 may be designed with a plurality of gates 40 which may be connected in such a way that the activity of the gates depends on the executed program or used content (data). The metering module 114 may conduct an initial measurement of the gate-level delays of a subset of the gates 40 in the aging circuit 115 by using the sub-modules 118 and 120. The processor 32 may compile each program 112 for execution on the processor 32 in such a way that it produces, with a specified frequency, specified data that age the gates 40 of aging circuit 115 in a specified way. The metering module 114 may further be arranged to conduct periodic or event driven measurements of the gate-level delays of a subset of the gates 40 in the aging circuit 115, again with sub-modules 118 and 120. In some embodiments, the design of the aging circuit 115 may be arranged to control aging in such a way that a set of specified time intervals, during which each gate is switched, may be accurately measured. The aging circuit 115 may be arranged to control aging in such a way that a set of specified time intervals for which each gate 40 switches may be accurately measured. The metering module 114 may be clocked with a specific frequency and the outputs of the metering module 114 may be zero unless the aging circuit 115 is aged beyond the preselected quantity of accumulative usage. For example, such accumulative usage may be specified by an agreement between a software provider and the owner of the processor 32.

With respect to the device 110 of FIG. 7 and the method of FIG. 9, for the purposes of illustration, the apparatus and method are illustrated with an aging circuit 115 which may be arranged to use the aging of gates or transistors with a predesigned aging circuit 115 having a butterfly network with XOR or NOR gates. There are many other embodiments that may be used herein where different subject metering, different aging phenomena, and different applications may be incorporated.

With respect to some embodiments of device 10 of FIG. 1, in various digital rights management and intellectual property applications, for example, aging circuit 16, metering module 23, and control module 25 of FIG. 1 may comprise a finite state machine (FSM) or like device. The FSM may be arranged to allow the overall IC, such as op entity driver 22 of FIG. 1 (e.g., processor 32 of FIG. 3), to operate when metering module 23 receives the anticipated output response from aging circuit 16. In other words, when the aging of aging circuit 16 does not reflect accumulated usage that exceeds some preselected threshold of accumulated usage of aging circuit 16, as specified by the measuring signal in FIG. 3, then the anticipated output response is received. If some or all of the gates of aging circuit 16 age beyond a specified level, the input to the control module 25 changes and, in some embodiments, it automatically may terminate the execution of the program that provides the pertinent input to aging circuit 16 or some associated hardware. It should be noted that in some embodiments the FSM may be less than 1% of the overall design and often much smaller in modern designs. In one embodiment, the FSM may be clocked at a specific frequency and its all outputs metering module 23 may be zero unless it is aged beyond the level as specified by the agreement between the software provider and the owner of the processor with aging circuit 16.

In various digital rights management and intellectual property applications, device 10 of FIG. 1 may address software and content piracy issues by adapting device 10 to be a security mechanism, based upon device aging, which not meters and also controls software or content usage. In these applications, device 10 may be used to enable pricing models where the software fees are functions of software or content use. As previously mentioned, hardware usage metering is a special case where all executed functionality is considered as a single program. For example, the cores for software-defined radio can be priced proportionally to how often they are actually used for communication. The hardware and software (intellectual property) metering may be arranged to enable reliable low overhead proofs for the number of manufactured parts and copied programs, respectively. Moreover, this HSCM technique may employ intrinsic aging properties of components in modern and pending ICs (ICs) to create a self-enforceable HSCM approach.

With respect to program metering, device 10 may be arranged to measure the amount of time a particular licensed program is used by designing aging circuit 16 to be exposed to unique inputs associated with each licensed program. If a particular licensed program is used longer than specified, device 10 may automatically disable itself. Licensing has become an important issue for software/hardware publishers and users. HSCM may play a major role as a part of maintaining license and usage agreements. Standard techniques in which the usage is somehow stored into registers or files (or even with the use of cryptographic protocols) may be easily defeated using physical attacks (e.g., radiation, power supply alternation). However, various embodiments of the presently disclosed techniques utilizing hardware aging may be virtually impossible to hack.

In various other applications, information about software and hardware usage can be leveraged in tasks such as power minimization, software evaluation and processor design because all these tasks can directly benefit from information about how often a piece of software and hardware is used. For example, the control module 25 of FIG. 1 may adjust the power level of the processor, so as to achieve power minimization. As will be obvious to those skilled in the art, other applications for device 10 may be undertaken.

In some embodiments, the time interval of authorized hardware, software, or data use may be measured using gate aging of aging circuit 16, as manifested by its slowdown. The slowdown may be measured using a plurality of gates and where subsets of the gates may be subject to different rates of the speed of reduction when subjected to the same level of activity. In some embodiments, the time interval of authorized hardware, software, or data use may be measured using gate aging, as manifested by its slowdown. The slowdown may be measured using the gates that are subject to the level of the activity that is a function of temperature so that the pace of aging may be principally proportional to the period of time when the circuitry is active. In some embodiments, the time interval may be measured of authorized hardware, software, or data use using transistor aging. The time interval may be measured using the change in the delay of plurality of transistors where subsets of them are subject to different rates of speed of reduction when subjected to the same level of activity. In some embodiments, the time interval of authorized hardware, software, or data use may be measured using gate aging, as manifested by its increase in switching power. The increase in switching power may be measured using a plurality of gates where subsets of them are subject to different rates of power increase when subjected to the same level of activity. In some embodiments, the time interval of authorized hardware, software, or data use may be measured using gate aging as manifested by its increase in leakage power. The increase in leakage power may be measured using a plurality of gates where subsets of them are subject to different rates of power increase when subjected to the same level of activity. In some embodiments, the time interval of authorized hardware, software, or data use may be measured using interconnect aging, as manifested by its slowdown. The slowdown may be measured using the interconnect that are subject to the level of the activity that is a function of temperature so that the pace of aging may be principally proportional to the period of time when the circuitry is active. In some embodiments, the time interval of authorized hardware, software, or data use may be measured for one or more operating entities that comprise the added circuitry in one or more modalities. In some embodiments, the time interval of authorized hardware, software, or data use may be processed using maximum likelihood or some other statistical procedure for improved reliability and accuracy. In some embodiments, the time interval of authorized hardware, software, or data use may be measured using a part of already existing components of the processors. In some embodiments, the time interval of authorized hardware, software, or data use may be measured using a part of already existing components of the processors that are most rarely used for regular operation and/or most suitable for delay or power measurements.

A more detailed description of some of the aging processes that may be incorporated or used in aging circuit 16 of FIG. 1 will be provided. Device aging is an irreversibly inherent process in essentially all ICs (ICs) and system technologies, such as aging circuit 16. Transistor delay and power characteristics deteriorate as a consequence of hot-carrier-induced (HCI) and NBTI effects. As a consequence of transistor activity, the physical structures of the transistors and other circuit components (including interconnect, passive components, active components, etc.) deteriorate following power laws. For example, NBTI effects increase the threshold voltage of the transistor and decrease the drain current and transconductance of the transistor, which directly impacts delay and power characteristics. Its importance is accentuated in modern and pending technologies and is more expressed as technology feature scales down.

NBTI is a known degradation factor in MOS-based circuits. During the last few years; however, NBTI has become a reliability issue in silicon ICs. Major reasons for that are: the gate electric fields have increased as a result of scaling, increased chip operating temperature, surface p-channel MOSFETs have replaced buried channel devices, and nitrogen is routinely added to thermally grown silicon dioxide ($SiO_2$). NBTI results in an increase in the absolute threshold voltage, a degradation of the mobility, drain current, and a degradation in the transconductance of p-channel MOSFETs. NBTI is almost universally attributed to the creation of interface traps and oxide charge by a negative gate bias at elevated temperature. The oxide electric field is usually, but not always, lower than that leading to hot carrier degradation. In a Reaction-Diffusion (RD) model, interface traps are generated at the $SiO_2$/Si interface (reaction) with a linear dependence on stress time.

NBTI degradation occurring in p-MOSFET devices has been reported as one of the most critical reliability issues that determines the operational lifetime of the CMOS devices in current deep sub-micron technologies. From the circuit designers' perspective, the NBTI degradation process may be manifested as an increase of device threshold voltage ($V_{th}$), which in turn results in a slowdown of transistor switching speed. Similar degradation has also been observed in n-MOSFET transistors with far less critical effect than NBTI on p-MOSFET and hence it may be considered negligible.

Also, electro-migration impacts tungsten contacts between transistors and wires, and wires themselves, which is relevant to aging circuit 16 including at least one interconnect. Due to material fatigue, crystal clocks (e.g., quartz and MEMS clocks) change their frequencies, flash memory loses its ability to rewrite data, fiber bandwidth changes its frequency response, some components of magnetic disks get demagnetized, etc. As mentioned above, each of these phenomena can be used for reliable hardware, software or content metering in device 10 of FIG. 1.

As previously mentioned, NBTI has become one of the major causes for performance degradation of nanoscale circuits. This intrinsic property is utilized in this example embodiment to characterize degradation of digital circuits and utilize it for intellectual property management. As described above, aging of aging circuit 16 of FIG. 1 may be controlled so as to measure hardware/software/content usage in an efficient and accurate way. Experimental results show not just viability of the technique but also surprisingly high accuracy in the presence of measurement noise and imperfect aging models.

Modern digital circuits are commonly composed of CMOS gates. In CMOS devices, the NBTI-induced threshold voltage shifts will occur over time, depending on the operating conditions of the device (e.g., aging circuit 16). The interaction of inversion layer holes with hydrogen-passivated Si atoms can break the SiH bonds, creating an interface trap and one H atom that can diffuse away from the interface (through the oxide) or can anneal an existing trap. The interface trap generation is modeled successfully in a Reaction-Diffusion framework. Bias temperature stress under constant voltage (DC) causes the generation of interface traps (NIT) between the gate oxide and silicon substrate, which translate to device threshold voltage ($v_t$) shift and loss of drive current ($I_{on}$). The NBTI effect is presently more severe for PMOS FETs than NMOS FETs due to the presence of holes in the PMOS inversion layer that are known to interact with the oxide states.

Figure 10:
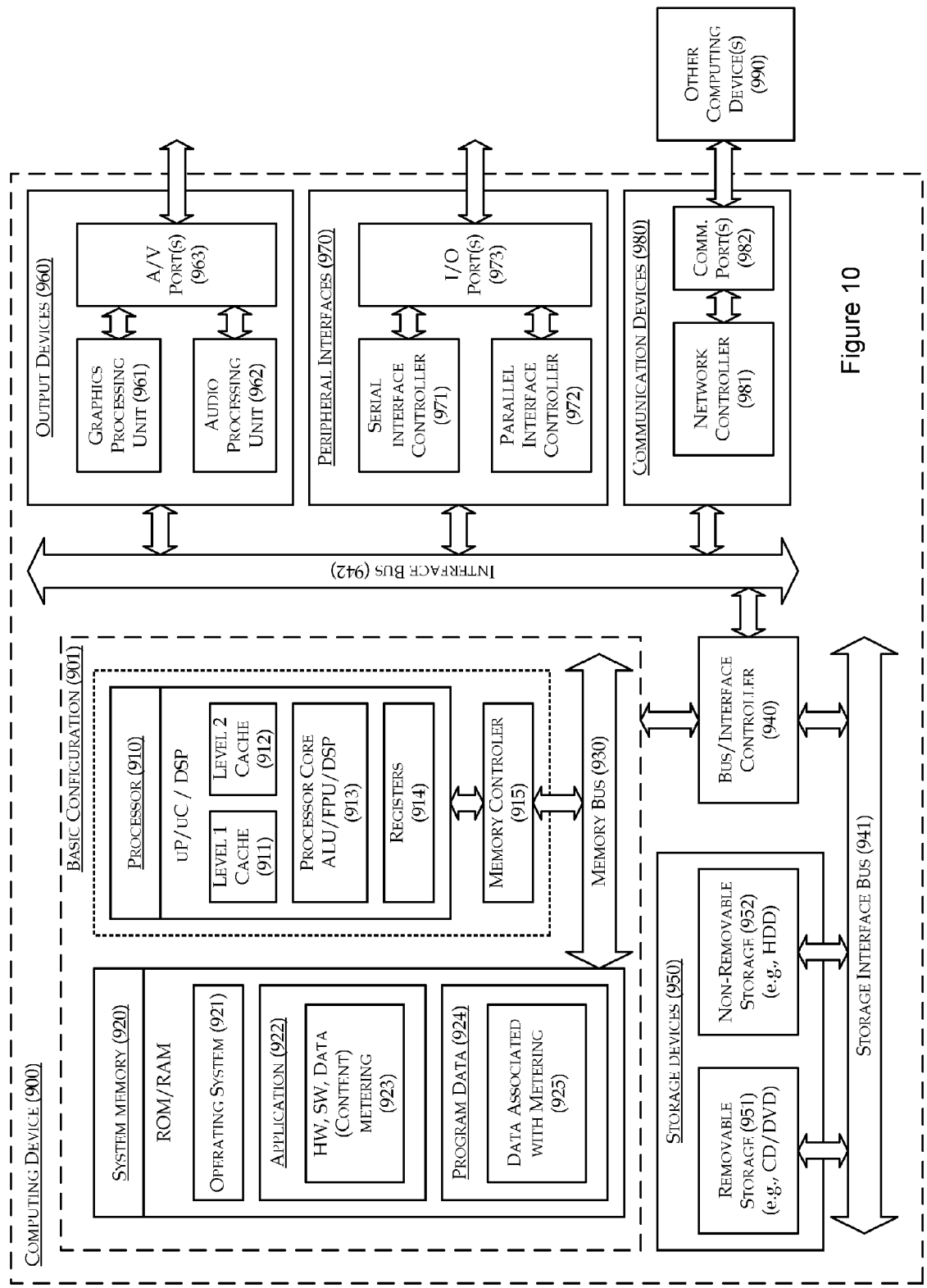
FIG. 10 illustrates an example computing device, in accordance with various embodiments, all arranged according to the present disclosure.

FIG. 10 is a block diagram illustrating an example computing device 900, in accordance with the present disclosure. In a very basic configuration 901, computing device 900 typically includes one or more processors 910 and system memory 920. A memory bus 930 may be used for communicating between the processor 910 and the system memory 920.

Depending on the desired configuration, processor 910 may be of any type including but not limited to a microprocessor (μP), a microcontroller (μC), a digital signal processor (DSP), or any combination thereof. Processor 910 may include one more levels of caching, such as a level one cache 911 and a level two cache 912, a processor core 913, and registers 914. An example processor core 913 may include an arithmetic logic unit (ALU), a floating point unit (FPU), a digital signal processing core (DSP Core), or any combination thereof. An example memory controller 915 may also be used with the processor 910, or in some implementations the memory controller 915 may be an internal part of the processor 910.

Depending on the desired configuration, the system memory 920 may be of any type including but not limited to volatile memory (such as RAM), non-volatile memory (such as ROM, flash memory, etc.) or any combination thereof. System memory 920 may include an operating system 921, one or more applications 922, and program data 924. Application 922 may include various metering applications metering hardware, software, and/or data (content) usage 923. Program Data 924 includes data associated with metering applications 923. In some embodiments, application 922 may be arranged to operate with program data 924 on an operating system 921. This described basic configuration is illustrated in FIG. 9 by those components within dashed line 901.

Computing device 900 may have additional features or functionality, and additional interfaces to facilitate communications between the basic configuration 901 and any required devices and interfaces. For example, a bus/interface controller 940 may be used to facilitate communications between the basic configuration 901 and one or more data storage devices 950 via a storage interface bus 941. The data storage devices 950 may be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of device 900.

Computing device 900 may also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which may be configured to communicate to various external devices such as a display or speakers via one or more A/V ports 963. Example peripheral interfaces 970 include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which may be arranged to facilitate communications with one or more other computing devices 990 over a network communication link via one or more communication ports 982.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

Articles of manufacture and/or systems may be employed to perform one or more methods as disclosed herein. FIG. 11 illustrates a block diagram of an example article of manufacture having a computer program product 1000 for user profile-based system level management (SLM), in accordance with various embodiments of the present disclosure. The computer program product 1000 may comprise computer readable storage medium 1032 and plurality of programming instructions 1034 stored in the computer readable storage medium 1032. In various ones of these embodiments, programming instructions 1034 when executed by a processor of an apparatus cause the apparatus to perform a number of operations. In various embodiments, programming instructions 1034 may include instructions to cause the apparatus to generate at least one in-use signal, with the at least one in-use signal having a signal duration representative of at least one usage episode of an operating entity. In various embodiments, programming instructions 1034 may further include instructions to cause the apparatus to apply the at least one in-use signal to an aging circuit to generate at least one age-affected signal. The aging circuit as described earlier includes at least one circuit path having at least one circuit component with a parameter performance irreversibly dependent on an accumulative usage of the aging circuit. In still other embodiments, programming instructions 1034 may further include instructions to cause the apparatus to measure a signal characteristic of the at least one age-affected signal and translating with the metering module the measured signal characteristic into a generated quantity of accumulative usage of the aging circuit.

Computer readable storage medium 1032 may take a variety of forms including, but not limited to, non-volatile and persistent memory, such as, but not limited to, compact disc read-only memory (CDROM) and flash memory.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software may become significant) a design choice representing cost versus efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that individual function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific ICs (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in ICs, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/ or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. An apparatus arranged to meter usage of a software program, comprising:
    a signal generator configured to generate at least one signal, the at least one signal having a variable signal duration representative of at least a duration of one usage episode of the software program;
    an aging circuit, coupled to the signal generator, configured to receive the at least one signal and generate at least one age-affected signal based at least in part on the at least one signal, the aging circuit including at least one circuit path having at least one circuit component with a component parameter, wherein the component parameter is subjected to aging effects caused by the at least one signal, with the aging effects being irreversible;
    a metering circuit, coupled to the aging circuit, configured to receive the at least one age-affected signal, measure a signal characteristic of the at least one age-affected signal, and translate the measured signal characteristic into a generated quantity of accumulative usage of the aging circuit, to indicate a quantity of usage of the software program; and
    a control circuit, coupled to the metering circuit, configured to selectively disable the software program in response to the generated quantity of accumulative usage of the aging circuit indicating a preselected quantity of accumulative usage of the software program, wherein the control circuit comprises an Exclusive OR gate arranged to disable the software program by receiving instructions of the software program and generating a plurality of junk instructions to replace the instructions of the software program.

2. The apparatus according to claim 1, wherein
    the metering circuit is to translate the measured signal characteristic into a generated quantity of accumulative usage that is proportionate to a quantity of accumulative usage of the software program.

3. The apparatus according to claim 1, wherein
    the metering circuit is to translate the measured signal characteristic into a generated quantity of accumulative usage that is equal to a quantity of accumulative usage of the software program.

4. The apparatus according to claim 1, further comprising a processor to operate a driver to operate the software program.

5. The apparatus according to claim 1, wherein the component parameter is a component delay.

6. The apparatus according to claim 1, wherein
the signal generator comprises a processor to operate a plurality of programming instructions to send the at least one signal to the aging circuit.

7. The apparatus according to claim 6, further comprising a memory coupled to the processor of the signal generator, and arranged to store the plurality of programming instructions.

8. The apparatus according to claim 6, wherein the signal characteristic is a signal value of the at least one-age affected signal and the metering circuit comprises
a reference signal generator coupled to the processor of the signal generator to receive a trigger signal and generate at least one measuring signal in response to the trigger signal; and
a signal comparator coupled to the aging circuit and the reference signal generator to compare the signal value of the at least one age-affected signal with a signal value of the at least one measuring signal, and to generate at least one event-driven metering signal when the signal value of the at least one age-affected signal exceeds the signal value of the at least one measuring signal, with the signal value of the at least one measuring signal reflecting a preselected quantity of the accumulative usage of the aging circuit.

9. The apparatus according to claim 8, wherein the reference signal generator comprises:
a triggered signal generator coupled to the processor of the signal generator to generate a triggered reference signal in response to the trigger signal;
at least one preset delay element coupled between the reference signal generator and the signal comparator, to receive the reference signal, and to delay the reference signal to generate the at least one measuring signal;
wherein the at least one preset delay element has a fixed quantity of delay, with the fixed quantity of delay being calculated to accommodate the preselected quantity of accumulative usage.

10. The apparatus according to claim 8, wherein
the reference signal generator of the metering circuit further comprises at least one programmable delay element coupled between the triggered signal generator and the at least one preset delay element;
the processor of the signal generator is to send an additional usage signal to the at least one programmable delay element; and
the at least one programmable delay element, is to delay the at least one measuring signal by a variable quantity of delay in response to the additional usage signal, the variable quantity of delay is calculated to accommodate an additional quantity of accumulative usage of the aging circuit.

11. The apparatus according to claim 8, wherein the signal comparator includes at least one arbiter coupled between the at least one preset delay element and the aging circuit, and wherein the signal comparator is to receive the at least one measuring signal and the at least one age-affected signal and arranged to generate the at least one event-driven metering signal when the signal value of the at least one age-affected signal is received after the signal value of the at least measuring signal, with the signal values corresponding to logic-level changes.

12. The apparatus according to claim 6, wherein the metering circuit further includes
a signal comparator coupled to the aging circuit and the processor, wherein the signal comparator is to compare the at least one age-affected signal with the at least one measuring signals and arranged to generate at least one event-driven metering signal when a signal value of the at least one age-affected signal exceeds a signal value of the at least one measuring signal, the signal value of the at least one measuring signal reflecting a preselected quantity of the accumulative usage of the aging circuit.

13. The apparatus according to claim 1, wherein the metering circuit is to translate the measured signal characteristic into the generated quantity of accumulative usage based in part upon a premeasured correlated data pair of a preselected quantity of accumulative usage and a correlated signal characteristic.

14. The apparatus according to claim 1, wherein the metering circuit is to translate the measured signal characteristic into the generated quantity of accumulative usage of the aging circuit, to indicate a quantity of usage of the software program, based at least in part on an application of a statistical optimization procedure.

15. A method of metering usage of a software program, comprising:
generating at least one signal having variable signal duration representative of at least a duration of one usage episode of the software program;
receiving the at least one signal by an aging circuit, and in response to the at least one signal, generating at least one age-affected signal, wherein the aging circuit includes at least one circuit path with at least one circuit component that has a parameter performance irreversibly dependent on an accumulative usage of the aging circuit;
measuring a signal characteristic of the at least one age-affected signal;
translating the measured signal characteristic into a generated quantity of accumulative usage of the aging circuit, to indicate an quantity of usage of the software program; and
selectively disabling the software program in response to the generated quantity of accumulative usage of the aging circuit indicating a preselected quantity of accumulative usage of the software program, wherein the disabling includes performing an Exclusive OR operation on a plurality of instructions of the software program to generate a plurality of junk instructions to replace the plurality of instructions of the software program.

16. The method according to claim 15, wherein said generating the at least one signal comprises setting the variable signal duration to equal or be proportional to a duration of the at least one usage episode of the software program so that the accumulative usage of the aging circuit is equal to or proportional to an accumulative usage of the software program.

17. The method according to claim 15, further comprising operating the software program with a driver.

18. The method according to claim 15, wherein the measured signal characteristic of the at least one age-affected signal corresponds to a signal value, wherein the measuring a signal characteristic and the translating signal characteristic comprises:
generating at least one measuring signal in response to the generating of the at least one signal and comparing the at least one age-affected signal with the at least one measuring signal; and
wherein the translating of the measured signal characteristic comprises generating at least one event-driven metering signal when the at least one age-affected signal exceeds the at least one measuring signal, wherein the at least one measuring signal reflects a preselected quantity of the accumulative usage of the aging circuit.

19. The method according to claim 18, wherein the measuring comprises delaying the at least one measuring signal by a preset fixed quantity of delay using a preset delay element to accommodate the preselected quantity of accumulative usage.

20. The method according to claim 19, wherein the measuring further comprises additionally delaying the at least one measuring signal with a variable quantity of delay using a programmable delay element to accommodate an additional quantity of accumulative usage of the aging circuit.

21. The method according to claim 19, further comprising:
measuring a correlated data pair of a preselected quantity of usage and a correlated signal value with a test aging circuit prior to a beginning of accumulative usage of the aging circuit; and
calculating the preset fixed delay quantity based upon the correlated data pair.

22. One or more tangible computer readable non-transitory storage media comprising a plurality of programming instructions stored therein, wherein the programming instructions, when executed by an apparatus, cause the apparatus to perform a method of metering usage of a software program, the method comprising:
generating at least one signal using a signal generator on the apparatus, the at least one signal having a variable signal duration representative of at least one usage episode of a software program of the apparatus;
receiving the at least one signal using an aging circuit on the apparatus;
generating at least one age-affected signal using the aging circuit, the aging circuit having at least one circuit path that includes at least one circuit component with a parameter performance irreversibly dependent on an accumulative usage of the aging circuit;
measuring a signal characteristic of the at least one age-affected signal;
translating the measured signal characteristic into a generated quantity of accumulative usage of the aging circuit, to indicate a quantity of usage of the software program; and
selectively disabling the software program in response to the generated quantity of accumulative usage of the aging circuit indicating a preselected quantity of accumulative usage of the software program, wherein disabling comprises performing an Exclusive OR operation on a plurality instructions of the software program to generate a plurality of junk instructions to replace the plurality of instructions of the software program.

23. The at least one storage medium according to claim 22, wherein the programming instructions, when executed, further cause the apparatus to operate the software program.

* * * * *

UNITED STATES PATENT AND TRADEMARK OFFICE
CERTIFICATE OF CORRECTION

PATENT NO. : 8,260,708 B2
APPLICATION NO. : 12/426141
DATED : September 4, 2012
INVENTOR(S) : Potkonjak Page 1 of 1

It is certified that error appears in the above-identified patent and that said Letters Patent is hereby corrected as shown below:

On the Cover Page, item (73), under "Assignee", in Column 1, Line 1, delete "Development" and insert -- Development, --, therefor.

Signed and Sealed this
Twelfth Day of March, 2013

Teresa Stanek Rea
*Acting Director of the United States Patent and Trademark Office*